(12) United States Patent
Holland et al.

(10) Patent No.: US 12,294,627 B2
(45) Date of Patent: May 6, 2025

(54) MAPPING NETWORKED DEVICES

(71) Applicant: QUALCOMM Incorporated, San Diego, CA (US)

(72) Inventors: Wesley James Holland, Encinitas, CA (US); Brian Vogelsang, San Diego, CA (US); Abhijeet Bisain, San Diego, CA (US); David Arellanes, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 17/392,156

(22) Filed: Aug. 2, 2021

(65) Prior Publication Data

US 2023/0035360 A1 Feb. 2, 2023

(51) Int. Cl.
*H04L 67/12* (2022.01)
*G06F 3/16* (2006.01)
(Continued)

(52) U.S. Cl.
CPC ............ *H04L 67/12* (2013.01); *G06F 3/16* (2013.01); *G06V 10/758* (2022.01); *G06V 10/98* (2022.01); *G06V 20/80* (2022.01); *G16Y 10/75* (2020.01); *G16Y 40/35* (2020.01); *G16Y 40/60* (2020.01); *H04N 23/66* (2023.01); *G06V 2201/02* (2022.01)

(58) Field of Classification Search
CPC ....... H04L 67/12; H04L 12/2807; G06F 3/16; G06F 3/011; G06V 10/758; G06V 10/98; G06V 20/80; G06V 2201/02; G16Y 10/75; G16Y 40/35; G16Y 40/60; H04N 23/66; H04N 21/4131; H04N 21/4122; G10L 25/51; G01S 5/0295; G01S 5/18; G01S 13/765; G01S 13/825; G01S 5/16
See application file for complete search history.

(56) References Cited

U.S. PATENT DOCUMENTS 11,423,624 B2   8/2022   Dedonato et al.
11,960,652 B2 *  4/2024  Kies ............... G06T 19/006
(Continued)

FOREIGN PATENT DOCUMENTS

CN   107851348 A   3/2018

OTHER PUBLICATIONS

Partial International Search Report—PCT/US2022/074224—ISA/EPO—Dec. 13, 2022.
(Continued)

*Primary Examiner* — Quan Zhen Wang
*Assistant Examiner* — Rajsheed O Black-Childress
(74) *Attorney, Agent, or Firm* — QUALCOMM Incorporated

(57) ABSTRACT

Systems, methods, and non-transitory media are provided for localizing and mapping smart devices. An example method can include receiving, by an extended reality (XR) device, an identification output from a connected device that is coupled directly or indirectly to the XR device, the identification output including an audio pattern, a display pattern, and/or a light pattern; detecting the identification output from the connected device; and based on the identification output from the connected device, mapping the connected device in a coordinate system of the XR device.

40 Claims, 9 Drawing Sheets

(51) Int. Cl.
*G06V 10/75* (2022.01)
*G06V 10/98* (2022.01)
*G06V 20/80* (2022.01)
*G16Y 10/75* (2020.01)
*G16Y 40/35* (2020.01)
*G16Y 40/60* (2020.01)
*H04N 23/66* (2023.01)

(56) References Cited

U.S. PATENT DOCUMENTS

| | | | |
|---|---|---|---|
| 2014/0118631 | A1 | 5/2014 | Cho |
| 2017/0048648 | A1* | 2/2017 | Lee .................... H04L 12/12 |
| 2021/0150818 | A1 | 5/2021 | Dedonato et al. |
| 2022/0405317 | A1* | 12/2022 | Marks .................... G06V 20/20 |

OTHER PUBLICATIONS

International Search Report and Written Opinion—PCT/US2022/074224—ISA/EPO—Feb. 3, 2023.

* cited by examiner

MAPPING NETWORKED DEVICES

TECHNICAL FIELD

The present disclosure generally relates to mapping networked devices for controlling and interacting with the networked devices. For example, aspects of the present disclosure relate to using extended reality systems to localize and map networked devices to control and interact with the networked devices.

BACKGROUND

Extended reality (e.g., augmented reality, virtual reality, etc.) devices, such as smart glasses and head-mounted displays (HMDs), generally implement cameras and sensors to track the position of the extended reality (XR) device and other objects within the physical environment. The XR reality devices can use the tracking information to provide a user of the XR device a realistic XR experience. For example, an XR device can allow a user to experience or interact with immersive virtual environments or content. To provide realistic XR experiences, XR technologies can integrate virtual content with the physical world, which can involve matching the relative pose and movement of objects and devices. The XR technologies can use tracking information to calculate the relative pose of devices, objects, and/or maps of the real-world environment in order to match the relative position and movement of the devices, objects, and/or the real-world environment, and anchor content to the real-world environment in a convincing manner. The relative pose information can be used to match virtual content with the user's perceived motion and the spatio-temporal state of the devices, objects, and real-world environment.

Some electronic devices, such as XR devices and other electronic devices (e.g., mobile phones, tablet computers, etc.), can be paired with other devices to interact with the other devices. For example, electronic devices can be paired with networked devices such as Internet-of-Things (IoT), connected, or smart-home devices (e.g., smart cameras, speakers, light bulbs, locks, plugs, thermostats, displays, televisions, security systems, appliances, etc.), to control the networked devices. Typically, the process to configure an electronic device to control a networked device or other electronic device can be difficult and generally involves time-consuming manual efforts.

BRIEF SUMMARY

Systems and techniques are described herein for localizing and mapping one or more devices such as networked devices (e.g., Internet-of-Things (IoT), connected or smart devices, etc.). According to at least one example, a method is provided for mapping networked devices to control the networked devices using an electronic device such as an extended reality (XR) device. The method can include receiving an identification output from a connected device that is coupled to an electronic device; and based on the identification output from the connected device, mapping the connected device in a coordinate system of the electronic device.

According to at least one example, a non-transitory computer-readable medium is provided for mapping networked devices to control the networked devices using an electronic device such as an XR device. In some examples, the non-transitory computer-readable medium can include instructions which, when executed by one or more processors, cause the one or more processors to receive an identification output from a connected device that is coupled to an electronic device; and based on the identification output from the connected device, map the connected device in a coordinate system of the electronic device.

According to at least one example, an apparatus is provided for mapping networked devices to control the networked devices using an electronic device such as an XR device. In some examples, the apparatus can include memory and one or more processors coupled to the memory, the one or more processors being configured to receive an identification output from a connected device that is coupled to an electronic device; and based on the identification output from the connected device, map the connected device in a coordinate system of the electronic device.

According to at least one example, another apparatus is provided for mapping networked devices to control the networked devices using an electronic device such as an XR device. In some examples, the apparatus can include means for receiving an identification output from a connected device that is coupled to an electronic device; and based on the identification output from the connected device, mapping the connected device in a coordinate system of the electronic device.

In some aspects, the method, non-transitory computer-readable medium, and apparatuses can include determining a location of the connected device based on the identification output; and based on the location of the connected device, mapping the connected device in the coordinate system of the electronic device.

In some examples, the identification output can include at least one of an audio pattern, a display pattern, a light pattern, and a radio signal.

In some aspects, the method, non-transitory computer-readable medium, and apparatuses can include sending, to the connected device, a signal configured to trigger an additional identification output from the connected device; based on a failure to receive the additional identification output, sending, to the connected device, one or more additional signals at one or more different times, the one or more additional signals being configured to trigger the additional identification output from the connected device; receiving the additional identification output from the connected device; and determining a location of the connected device based on the additional identification output. In some examples, mapping the connected device in the coordinate system of the electronic device can include updating a device map to associate the connected device with the location of the connected device.

In some examples, sending the one or more additional signals at one or more different times can include determining the failure to receive the additional identification output while at least one of the electronic device is within a threshold proximity to a mapped location of the connected device and the mapped location of the connected device is within a field-of-view of an image sensor of the electronic device; and sending the one or more additional signals to the connected device based on the failure to receive the additional identification output.

In some examples, sending the one or more additional signals at one or more different times can include sending the one or more additional signals periodically until at least one of a predetermined amount of time lapses without receiving the additional identification output from the connected device and a number of additional signals is sent without receiving the additional identification output from the connected device.

In some examples, receiving the identification output from the connected device can include detecting one or more patterns in the identification output based on data from one or more sensors of the electronic device; and recognizing the one or more patterns as the identification output from the connected device.

In some cases, the one or more patterns can include an audio pattern and the one or more sensors can include an audio sensor. In some cases, the one or more patterns can include a display pattern and the one or more sensors can include an image sensor. In some cases, the one or more patterns can include a light pattern and the one or more sensors can include a light sensor.

In some aspects, recognizing the one or more patterns as the identification output from the connected device can include recognizing the one or more patterns as the identification output using at least one of a neural network and feature matching.

In some aspects, the method, non-transitory computer-readable medium, and apparatuses can include receiving a request to trigger an action by the connected device; identifying a location of the connected device based on the mapping of the connected device; and sending, to the connected device, a command configured to trigger the action by the connected device.

In some cases, the request to trigger the action by the connected device can include a request to send to the electronic device a video feed captured by the connected device. In some examples, the method, non-transitory computer-readable medium, and apparatuses can include sending the command to the connected device, wherein the command is configured to trigger the connected device to send the video feed to the electronic device; receiving the video feed from the connected device; and displaying the video feed at the electronic device.

In some examples, the request to trigger the action by the connected device can include a request to trigger the connected device to display content from the electronic device, and sending the command to the connected device can include sending, to the connected device, data including the command and the content from the electronic device. In some examples, the command is configured to trigger the connected device to display the content from the electronic device.

In some examples, the request to trigger the action by the connected device can include a request to adjust a power mode of the connected device, and the command is configured to adjust the power mode of the connected device.

In some cases, the connected device can include a light bulb, the request to trigger the action by the connected device can include a request to adjust at least one of a brightness and a color of light emitted by the light bulb, and the command is configured to trigger the light bulb to adjust at least one of the brightness and the color of light emitted by the light bulb.

In some aspects, the method, non-transitory computer-readable medium, and apparatuses can include detecting a gesture by a user associated with the electronic device, the gesture indicating a location of the connected device; based on the gesture, triggering one or more identification outputs from one or more connected devices in a physical environment; receiving a particular identification output from the one or more identification outputs, the particular identification output originating from the location; and determining, based on the particular identification output, that the connected device is located at the location. In some examples, mapping the connected device in the coordinate system of the electronic device can include updating a device map to associate the connected device with the location of the connected device.

In some aspects, the method, non-transitory computer-readable medium, and apparatuses can include receiving a voice command by a user associated with the electronic device, the voice command indicating a location of the connected device; based on the voice command, triggering one or more identification outputs from one or more connected devices in a physical environment; receiving a particular identification output from the one or more identification outputs, the particular identification output originating from the location; and determining, based on the particular identification output, that the connected device is located at the location.

In some aspects, the method, non-transitory computer-readable medium, and apparatuses can include triggering one or more connected devices to enter a mapping mode; sending, to the one or more connected devices, a device identification output; receive localization information from the one or more connected devices, the localization information indicating a location of the one or more connected devices relative to the electronic device; and based on the localization information from the one or more connected devices, mapping the one or more connected devices in the coordinate system of the electronic device.

In some aspects, the method, non-transitory computer-readable medium, and apparatuses can include triggering one or more connected devices to enter a mapping mode; receiving localization information from the one or more connected devices, the localization information indicating a first location of a landmark relative to the one or more connected devices; determining a second location of the one or more connected devices based on the localization information and a third location of the landmark relative to the electronic device; and mapping the one or more connected devices in the coordinate system of the electronic device based on the second location of the one or more connected devices.

In some examples, the identification output can include a light pattern, and the light pattern can include at least one of a pattern of light dimming and brightening levels emitted by the electronic device, a pattern of color temperature changes of light emitted by the electronic device, and a sequence of blinking light emitted by the electronic device.

In some examples, the identification output can include a display pattern, and the display pattern can include at least one of a code displayed on a display device of the electronic device, an image displayed on the display device of the electronic device, a visual pattern displayed on the display device of the electronic device, and a digital object displayed on the display device of the electronic device.

In some examples, the identification output can include an audio pattern, and the audio pattern can include at least one of an audio code output by the electronic device and a sequence of sounds output by the electronic device.

In some aspects, the method, non-transitory computer-readable medium, and apparatuses can include sending, to the connected device, a signal configured to trigger the identification output from the connected device; and receiving the identification output from the connected device.

In some cases, receiving the identification output can include receiving one or more identification outputs from a plurality of identification outputs broadcasted by the connected device, the one or more identification outputs including the identification output.

In some cases, the connected device is at least one of a light bulb, a speaker, a television, a microphone, one or more sensors, a camera, a thermostat, and a wearable device.

In some examples, the identification output can include a received radio signal.

In some aspects, each of the apparatuses described above is, can be part of, or can include a networked device and/or an XR device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
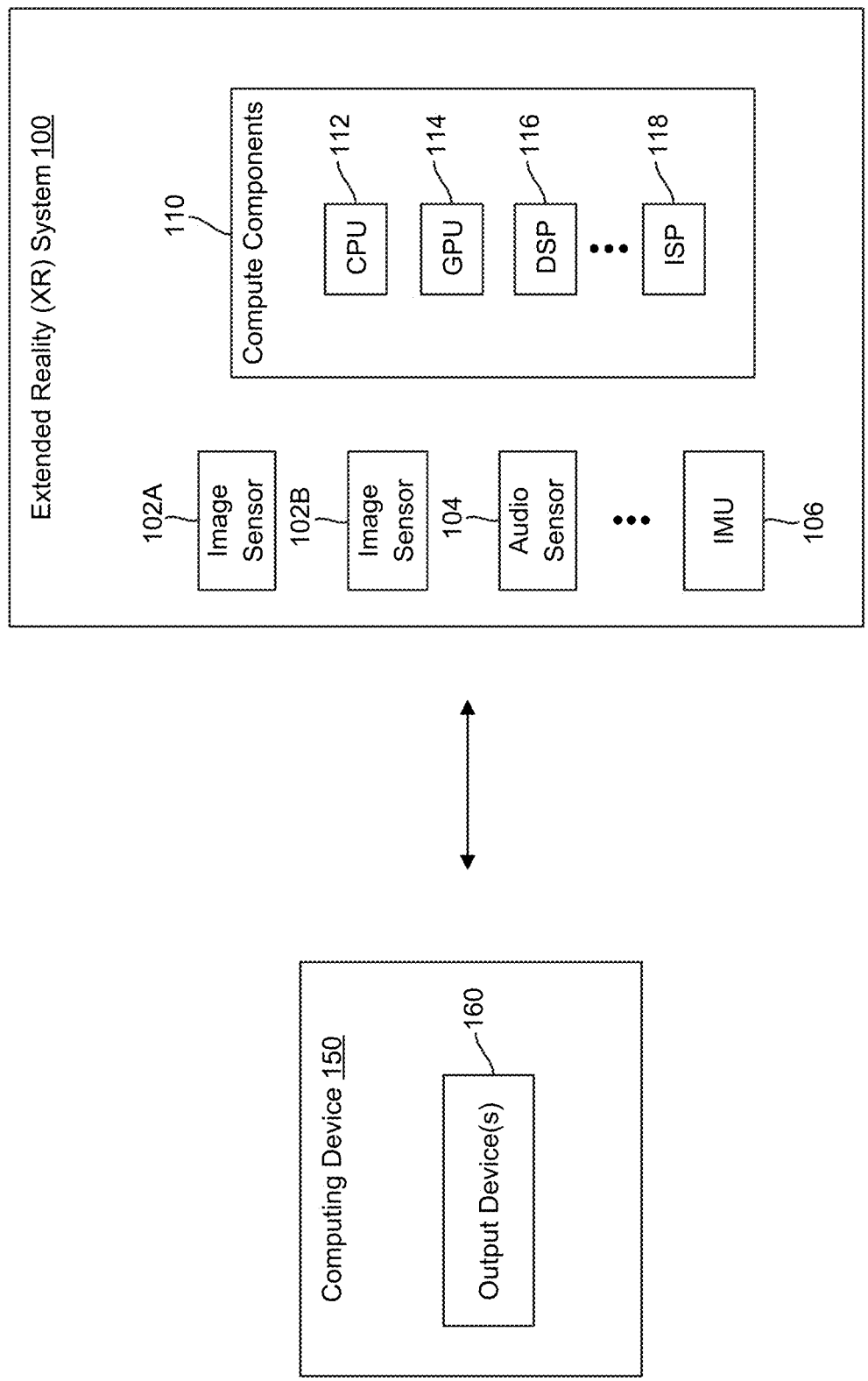
FIG. 1 is a diagram illustrating an example of an extended reality system used to localize, map, and/or control a computing device, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, extended reality (e.g., augmented reality, virtual reality, etc.) devices, such as smart glasses and head-mounted displays (HMDs), can implement cameras and a variety of sensors to track the position of the extended reality (XR) device and other objects within the physical environment. The XR devices can use such tracking information to provide a user of the XR device a realistic XR experience. For example, an XR device can allow a user to experience or interact with immersive virtual environments or content. To provide realistic XR experiences, XR technologies generally aim to integrate virtual content with the physical world. In some examples, XR technologies involve matching the relative pose and movement of objects and devices. For example, an XR device can use tracking information to calculate the relative pose of devices, objects, and/or generate maps of the real-world environment in order to match the relative position and movement of the devices, objects, and/or the real-world environment. Using the pose and/or movement of one or more devices, objects, and/or the real-world environment, the XR device can anchor content to the real-world environment in a convincing manner and/or enable interactions with the real-world environment. The relative pose information can be used to match virtual content with the user's perceived motion and the spatio-temporal state of the devices, objects, and real-world environment, and can support XR experiences and interactions with the real-world environment.

In some examples, an electronic device, such as an XR device or other electronic device (e.g., mobile phone, smart wearable device, tablet computer, laptop computer, etc.), can be paired with a different device such as a networked device (e.g., an Internet-of-Things (IoT) or connected device such as a smart hub, lightbulb, speaker, camera, doorbell, security system, lock, plug, switch, thermostat, alarm system, television, appliance, etc.). For example, a user can configure an XR device to control a networked speaker, a networked light, networked appliance, or other smart/connected device in a room. To illustrate, in the example of a networked light, the user can conveniently control the networked light through the XR device rather than using a light switch to turn on or off the light. However, the process to configure an electronic device to control a networked device can involve manual efforts, and can be difficult and even confusing for many users. The process to localize and map a networked device to allow an electronic device to know the location of the networked device and control the networked device can also be difficult and time consuming. In many cases, a networked device can change locations, which can render a previously-mapped location of that smart device inaccurate/obsolete and can impact the electronic device's ability to control and/or interact with the networked device after the location change. Moreover, each time a mapped networked device moves to a different location, the electronic device may need to perform another complicated and time-consuming process of localizing and mapping the networked device.

In some examples, the XR capabilities of an XR device can be leveraged to enable more intuitive and natural interactions with certain devices, such as networked devices, from the XR device. For example, hand tracking and gesture recognition capabilities of XR devices can be leveraged to allow a user of an XR device to use gestures and other XR-based interactions to control networked devices. To facilitate and/or improve such interactions, the XR device may localize and map the networked devices that a user wishes to control from the XR device. As previously noted, localizing and mapping the networked devices can be a challenging task. In many cases, the XR device may not have information about the location of a particular networked device in order to localize and map it. For example, in a room with multiple networked devices, the XR device may not know where a particular networked device of interest is located or even which of the networked devices in the room is the particular networked device of interest.

To illustrate, in a room with multiple networked light bulbs, the XR device may not know where a particular networked light bulb from the multiple networked light bulbs is located in order to localize and map it. In some cases, there may be additional networked devices in nearby rooms which may be located even closer to the XR device than one or more of the networked devices in the room and may increase the difficulty of localizing and mapping a particular networked device. Since many networked devices are mobile, even if the room or building has only one networked device, the networked device may change locations, which may render a previously-mapped location of the networked device inaccurate/obsolete and may prevent the XR device from controlling and/or interacting with the networked device at its new location.

Systems, apparatuses, methods (also referred to as processes), and computer-readable media (collectively referred to herein as "systems and techniques") are described herein for localizing and mapping controllable devices, such as networked devices (e.g., smart devices, IoT devices, connected devices) for control by other electronic devices, such as XR devices. While networked or smart devices (e.g., IoT devices and/or other devices with capabilities for Internet/network connectivity) are used herein as examples of controllable devices, the techniques described herein can be performed by or for any device that is controllable by another device. In some examples, the systems and techniques described herein can allow smart devices to be localized and mapped for XR control. An example XR device can localize and map a smart device to understand where the smart device is spatially located in the real world and within the internal coordinate system of the XR device. Localizing and mapping smart devices for extended reality can allow an XR device to enable more intuitive interactions with smart devices from the XR device. In some examples, an XR device can localize and map a smart device using sensor data from one or more sensors on the XR device such as, for example, image data from an image sensor, audio data from an audio sensor, etc.

In some cases, an XR device can remotely trigger a smart device to generate an identification output that the XR device can detect and use to localize and map the smart device. The XR device can identify and associate the identification output with the triggered smart device for future control of the smart device through the XR device. For example, a user of the XR device can remotely trigger the smart device from an application on the XR device, such as a registration application associated with the smart device. The smart device can generate the identification output based on the remote trigger. The XR device can use one or more sensors, such as an image sensor and/or an audio sensor, to detect the identification output from the smart device. The XR device can use the identification output to localize and map the smart device for current and/or future control of the smart device from the XR device.

The smart device can generate the identification output in a number of ways. In some examples, the smart device can output a particular pattern that the XR device can recognize as an identification output. To illustrate, in an example involving a smart device having light-emitting capabilities (e.g., a smart television (TV), light bulb, etc.), the smart device can output a pattern of dimming and brightening light. The XR device can detect and recognize the dimming and brightening pattern as an identification output. In some cases, the dimming and brightening pattern can be visible to the human eye (e.g., within the visible light spectrum). In other cases, the dimming and brightening pattern can be imperceptible to the human eye in terms of wavelength and/or duration. As another example, the smart device can change the color temperature of the smart device according to a pattern that the XR device can detect and recognize as an identification output. The color temperature pattern can be visible to the human eye or imperceptible (e.g., in wavelength and/or duration) to the human eye. In some cases, the smart device can emit a pattern of light (visible or invisible to the human eye), which the XR device can detect and recognize as the identification output. For example, the smart device can emit infrared (IR) light that the XR device can detect and recognize as the identification output.

In some cases, the smart device can encode an identification output in a wireless signal(s) transmitted by the smart device. For example, the smart device can use Bluetooth to communicate with the XR device. The smart device can use Bluetooth to send a code or pattern representing the identification output to the XR device. The XR device can receive the Bluetooth communication from the smart device and identify the code or pattern in the Bluetooth communication. The XR device can use the identified code or pattern to localize the smart device as further described herein.

In some examples, a smart device can have display capabilities (e.g., a smart hub, TV, screen, etc.), audio capabilities, and/or other output capabilities (e.g., emitting light, etc.). In some cases, a smart device with display capabilities can output a display pattern (e.g., a Quick Response (QR) code, a barcode, an image, a video, an animation, a rendered object, a graphic, a visual pattern, etc.). The display pattern can be visible to the human eye or imperceptible (e.g., in wavelength and/or duration) to the human eye. The XR device can detect and recognize the display pattern as an identification output. In some cases, a smart device with audio capabilities can output an audio pattern (e.g., Morse code, noise, a sequence of tones, or any other audio pattern), which can be perceptible to the human ear or imperceptible to the human ear in duration and/or frequency (e.g., ultrasound). The XR device can detect and recognize the audio pattern as an identification output. In other examples, the smart device can output any other type of pattern or combination of patterns, such as a combination of light, color temperature, display, and/or audio patterns.

In some examples, the XR device can detect an identification output from a smart device using a deep neural network. For example, to detect an identification output including a light, display, and/or audio pattern, a deep neural network can be pre-trained on a set of image data and/or audio data including examples of relevant identification outputs. In some examples, the XR device can detect an identification output via cross-correlation of a digest (e.g., over time) of output statistics, such as brightness and contrast statistics, exceeding a predetermined threshold. In some cases, the XR device can detect an identification output via audio or visual feature matching. For example, the XR device can identify keypoints in an image capturing a visual output, such as a displayed code, and extract features in the image corresponding to the visual output. The XR device can generate feature descriptions for the extracted features. The XR device can match the keypoints, features, and/or feature descriptions with keypoints, features, and/or feature descriptions associated with the visual output. The XR device can detect the visual output based on such feature matching. The XR device can perform similar feature matching with audio data to detect audio outputs.

In some cases, the XR device can track the location of a smart device dynamically. For example, the XR device can perform relocalization to track the location of a smart device in case or if the location of the smart device has changed after a previous localization. The XR device can perform a mapping process periodically and/or as needed. In some examples, when the XR device believes it is near a previously-mapped smart device, the XR device can trigger the identification output to check if the smart device is still in the previously-mapped location. If the XR device determines that the smart device is not located where expected, the XR device can trigger the identification output periodically. When the XR device finds the smart device based on an identification output, the XR device can update the location of the smart device in the XR device's map of smart devices.

In some cases, the smart device can detect when the location of the smart device has changed and trigger a relocalization by the XR device. For example, the smart device can detect that its location has changed based on a network signal of the smart device and/or a characteristic (e.g., signal strength, etc.) of a network signal of the smart device, sensor data (e.g., image data captured by an image sensor of the smart device, inertial data captured by an inertial measurement unit of the smart device, etc. In some cases, when the smart device detects that its location has changed, the smart device can notify the XR device that the location of the smart device has changed. For example, the smart device can send a wireless signal (e.g., a Bluetooth communication, a WiFi communication, etc.) to the XR device. The wireless signal can include an indication (e.g., data, a pattern, etc.) of the change in the location of the smart device. In another example, when the smart device detects that its location has changed, the smart device can output an identification output for detection by the XR device. The identification output can trigger the relocalization by the XR device.

In another example, the user of the XR device can execute an action indicating a desire to interact with a smart device, such as pointing to the smart device, maintaining an eye gaze towards the smart device, maintaining a head pose towards the smart device, touching the smart device, etc. In some cases, the action can identify, suggest or imply a location of the smart device. If a smart device is not mapped at such location (or the smart device of interest is not mapped at such location), the XR device can trigger an identification output for all known/mapped smart devices until a matching identification output is detected. The XR device can then update the XR device's map of smart devices to include the smart device at the determined location of the smart device.

In some examples, instead of (or in addition to) triggering the smart device to identify itself (e.g., via an identification output), the XR device can use hand tracking to localize and map the smart device. For example, the user can touch the smart device with a finger, which is tracked/localized by the XR device, and tag that location in the XR device's map of smart devices with the identified smart device.

In some cases, the XR device can leverage image and/or audio sensors on a smart device to localize the smart device and/or the XR device relative to each other, and map the smart device. For example, the XR device can use one or more smart devices to localize and/or map the XR device. In some examples, the XR device can remotely trigger a smart device to enter mapping mode. Based on the trigger, the smart device can begin looking for an identification output from the XR device. Upon detecting the identification output from the XR device, the smart device can localize itself relative to the XR device and relay the localization information to the XR device. The XR device can translate the localization information to its map of smart devices and identify/associate the smart device with the determined location.

In some cases, the XR device can leverage one or more smart devices with image and/or audio sensors to localize and map a smart device. For example, the XR device can remotely trigger smart devices in the environment to enter mapping mode. The smart devices can share a feature vector (e.g., audio and/or visual feature vector) with the XR device. The XR device can match the feature vector of a smart device shared by one or more smart devices against a feature vector obtained by the XR device. The XR device can translate the localization information to its map of smart devices and identify/associate the smart device with the determined location.

Various aspects of the application will be described with respect to the figures.

FIG. 1 is a diagram illustrating an example of an XR system 100 used to localize, map, and/or control a computing device 150, in accordance with some examples of the present disclosure. The XR system 100 can be used to control the computing device 150 using XR and/or any other techniques described herein. The computing device 150 can include a smart device (e.g., an IoT/connected device, etc.) such as, for example and without limitation, a smart wearable device (e.g., a smart watch, ring, bracelet, glove, medical/fitness tracker, etc.), a smart lock, a smart bicycle, a smart security system, a smart light, a smart hub, a smart camera, a smart refrigerator, a smart speaker, a smart medical sensor, a smart television, a smart switch, a smart assistant, a smart thermostat, a robotic vacuum cleaner, a mobile computing device (e.g., a laptop computer, a tablet computer, a smartphone, etc.), a video game system, a global positioning system (GPS) device, a smart alarm, a smart scanner, a smart plug, a smart assistant, a smart appliance, smart equipment, an embedded system, a smart home device, or any other smart, connected, and/or wireless device.

The XR system 100 and the computing device 150 can be communicatively coupled to allow the XR system 100 to interact with and control the computing device 150. In some examples, the XR system 100 can implement one or more XR applications such as, for example and without limitation, an XR application for managing and/or controlling computing devices (e.g., computing device 150), a smart home application, a video game application, a device control application, an autonomous driving application, a navigation application, a productivity application, a social media application, a communications application, a modeling application, a media application, an electronic commerce application, a browser application, a design application, a map application, and/or any other XR application.

In some examples, the XR system 100 can include an electronic device configured to use information about the relative pose of the XR system 100 and/or the computing device 150 to provide one or more functionalities, such as XR functionalities (e.g., localization/tracking, detection, classification, mapping, content rendering, etc.), device management and/or control functionalities, gaming functionalities, autonomous driving or navigation functionalities, computer vision functionalities, robotic functions, etc. For example, in some cases, the XR system 100 can be an XR device (e.g., a head-mounted display, a heads-up display device, smart glasses, etc.) configured to detect, localize, and map the location of the computing device 150 and communicate with the computing device 150 to control one or more operations/states of the computing device 150.

In the illustrative example shown in FIG. 1, the XR system 100 can include one or more image sensors, such as image sensors 102A and 102B (collectively referred to as "image sensors 102" hereinafter), an audio sensor 104 (e.g., an ultrasonic sensor, a microphone, etc.), an inertial measurement unit (IMU) 106, and one or more compute components 110. In some cases, the XR system 100 can optionally include one or more other/additional sensors such as, for example and without limitation, a radar, a light detection and ranging (LIDAR) sensor, a touch sensor, a pressure sensor (e.g., a barometric air pressure sensor and/or any other pressure sensor), a gyroscope, an accelerometer, a magnetometer, and/or any other sensor. In some examples, the XR system 100 can include additional sensors and/or components such as, for example, a light-emitting diode (LED) device, a storage device, a cache, a communications interface, a display, a memory device, etc. An example architecture and example hardware components that can be implemented by the XR system 100 are further described below with respect to FIG. 9.

The XR system 100 can be part of, or implemented by, a single computing device or multiple computing devices. In some examples, the XR system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s).

In some implementations, the image sensors 102, the audio sensor 104, the IMU 106, and/or the one or more compute components 110 can be part of the same computing device. For example, in some cases, the image sensors 102, the audio sensor 104, the IMU 106, and/or the one or more compute components 110 can be integrated with or into a camera system, a smartphone, a laptop, a tablet computer, a smart wearable device, an XR device such as an HMD, an IoT device, a gaming system, and/or any other computing device. In other implementations, the image sensors 102, the audio sensor 104, the IMU 106, and/or the one or more compute components 110 can be part of, or implemented by, two or more separate computing devices.

The one or more compute components 110 of the XR system 100 can include, for example and without limitation, a central processing unit (CPU) 112, a graphics processing unit (GPU) 114, a digital signal processor (DSP) 116, and/or an image signal processor (ISP) 118. In some examples, the XR system 100 can include other processors such as, for example, a computer vision (CV) processor, a neural network processor (NNP), an application-specific integrated circuit (ASIC), a field-programmable gate array (FPGA), etc. The XR system 100 can use the one or more compute components 110 to perform various computing operations such as, for example, extended reality operations (e.g., tracking, localization, object detection, classification, pose estimation, mapping, content anchoring, content rendering, etc.), device control operations, image/video processing, graphics rendering, machine learning, data processing, modeling, calculations, computer vision, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensors 102 can include any image and/or video sensor or capturing device, such as a digital camera sensor, a video camera sensor, a smartphone camera sensor, an image/video capture device on an electronic apparatus such as a television or computer, a camera, etc. In some cases, the image sensors 102 can be part of a camera or computing device such as a digital camera, a video camera, an IP camera, a smartphone, a smart television, a game system, etc. Moreover, in some cases, the image sensors 102 can include multiple image sensors, such as rear and front sensor devices, and can be part of a dual-camera or other multi-camera assembly (e.g., including two cameras, three cameras, four cameras, or other number of cameras).

In some examples, each image sensor of the image sensors 102 can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform XR processing operations using data from one or more of the image sensors 102, the audio sensor 104, the IMU 106, and/or the computing device 150. For example, in some cases, the one or more compute components 110 can perform tracking, localization, object detection, object classification, pose estimation, shape estimation, mapping, content anchoring, content rendering, image processing, modeling, content generation, gesture detection, gesture recognition, and/or other operations based on data from the image sensors 102, the audio sensor 104, the IMU 106, and/or the computing device 150. In some examples, the one or more compute components 110 can use data from one or more of the image sensors 102, the audio sensor 104, the IMU 106, and/or the computing device 150 to generate a three-dimensional (3D) map of the environment and track the location of the XR system 100 within the 3D environment. In some examples, the one or more compute components 110 can detect, localize, and map the computing device 150 and/or control an operation/state of the computing device 150, based on data from the image sensors 102, the audio sensor 104, the IMU 106, and/or the computing device 150.

In some examples, the one or more compute components 110 can implement one or more algorithms for tracking and estimating a relative pose of the XR system 100 and/or the computing device 150. In some cases, the one or more compute components 110 can receive image data captured by one or more of the image sensors 102 and perform pose estimation based on the received image data to calculate a relative pose of the computing device 150 and the XR system 100. In some examples, the one or more compute components 110 can receive sensor data (e.g., image data from image sensors 102, data from the audio sensor 104, the IMU 106, etc.), and use such data to track and/or map the computing device 150. In some cases, the one or more compute components 110 can implement one or more computer vision models to calculate a relative pose of the computing device 150 and the XR system 100.

In some cases, the XR system 100 can use one or more of the image sensors 102 to detect light patterns generated by the computing device 150. The light patterns can include an identification output that the XR system 100 can use to detect, localize, and map the computing device 150, as further explained herein. In some examples, the light patterns can include a pattern(s) of changing light levels (e.g., dimming and brightening) emitted by the computing device 150, a pattern of changing color temperature of light emitted by the computing device 150, a display pattern (e.g., a quick response (QR) code, a barcode, a displayed object, a displayed image, etc.), and/or any other light/visual pattern. In some cases, a light pattern can include light that is visible or invisible to the human eye. In some examples, a light pattern can include IR light emitted by the computing device 150.

In some cases, the XR system 100 can use audio sensor 104 to detect an audio pattern generated by the computing device 150. The audio pattern can include an identification output that the XR system 100 can use to detect, localize, and map the computing device 150, as further explained herein. In some examples, the audio pattern can include a pattern of sound such as, for example, a Morse code, a noise sequence, and/or any other modulated audio or pattern of sound. In some cases, the XR system 100 can use the audio sensor 104 to measure distance information to assist in tracking, localization, mapping, and/or other XR functionalities. For example, the XR system 100 can use the audio sensor 104 to measure a distance between the XR system 100 and the computing device 150.

In some cases, the IMU 106 can detect an acceleration, angular rate, and/or orientation of the XR system 100 and generate measurements based on the detected acceleration. In some cases, the IMU 106 can detect and measure the orientation, linear velocity, and/or angular rate of the XR system 100. For example, the IMU 106 can measure a movement and/or a pitch, roll, and yaw of the XR system 100. In some examples, the XR system 100 can use measurements obtained by the IMU 106 and/or image data from one or more of the image sensors 102 to calculate a pose of the XR system 100 within 3D space. In some cases, the XR system 100 can additionally or alternatively use sensor data from the audio sensor 104 and/or the computing device 150 to perform tracking, pose estimation, mapping, and/or other operations.

The computing device 150 can include one or more output devices 160 that can output/emit a pattern such as, for example, a light pattern, an audio pattern, a radio pattern, a code or pattern encoded in a Bluetooth signal, and/or any combination thereof. The pattern can include an identification output that the XR system 100 can use to detect, localize, and map the computing device 150. The XR system 100 can detect the pattern emitted by the output device(s) 160 and use the pattern to localize and map the computing device 150, as further explained herein.

The output device(s) 160 can include one or more sensors and/or components such as, for example and without limitation, a display, a speaker, a microphone, an image sensor, an LED device, a light-emitting device, a pressure sensor, an IMU, a communication interface (e.g., wireless radio, etc.), a radar, etc. In some examples, the computing device 150 can include one or more wireless communication interfaces (not shown) for communicating with the XR system 100. In some examples, the communication interface can include a wireless transmitter, a wireless transceiver, or any other means for wireless communications and/or transmitting data. The communication interface can implement any wireless protocol and/or technology to communicate with the XR system 100, such as Wi-Fi, Bluetooth, ZigBee, cellular, etc. In other examples, the computing device 150 can include more or less sensors, output device(s), and/or components (of the same and/or different types) than shown in FIG. 1. In some cases, the computing device 150 can include one or more other components that are not shown in FIG. 1 such as, for example and without limitation, a microcontroller, an actuator, a storage device, memory, cache, a processing device, etc.

The components shown in FIG. 1 with respect to the XR system 100 and the computing device 150 are merely illustrative examples provided for explanation purposes. In other examples, the XR system 100 and/or the computing device 150 can include more or less components than those shown in FIG. 1. While the XR system 100 and the computing device 150 are shown to include certain components, one of ordinary skill will appreciate that the XR system 100 and the computing device 150 can include more or fewer components than those shown in FIG. 1. For example, the XR system 100 and/or the computing device 150 can also include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the XR system 100 and/or the computing device 150 are described below with respect to FIG. 9.

As previously noted, the XR system 100 can enable XR interactions with a smart device (e.g., the computing device 150). For example, the XR system 100 can allow a user wearing the XR system 100 to point to a smart bulb to turn it on. As another example, the XR system 100 can stream a video feed of nearby security cameras and/or render a visual overlay (e.g., a transparent red outline, a message, etc.) over doors for which a security system is armed. In some examples, the XR system 100 can share content from the XR system 100 to a nearby smart television, and/or communicate with a smart hub/assistant and indicate to the smart hub/assistant that a user wearing the XR system is speaking to the smart hub/assistant so the smart hub/assistant understand that the user is not speaking to another person or device.

To facilitate such interactions, the XR system 100 can localize and map the smart devices, as further described herein. The localizing and mapping of the smart devices can allow the XR system 100 to know where the smart devices exist (spatially) in the internal coordinate system of the XR system 100. The XR system 100 can use this information to enable interactions with the smart devices.

Figure 2:
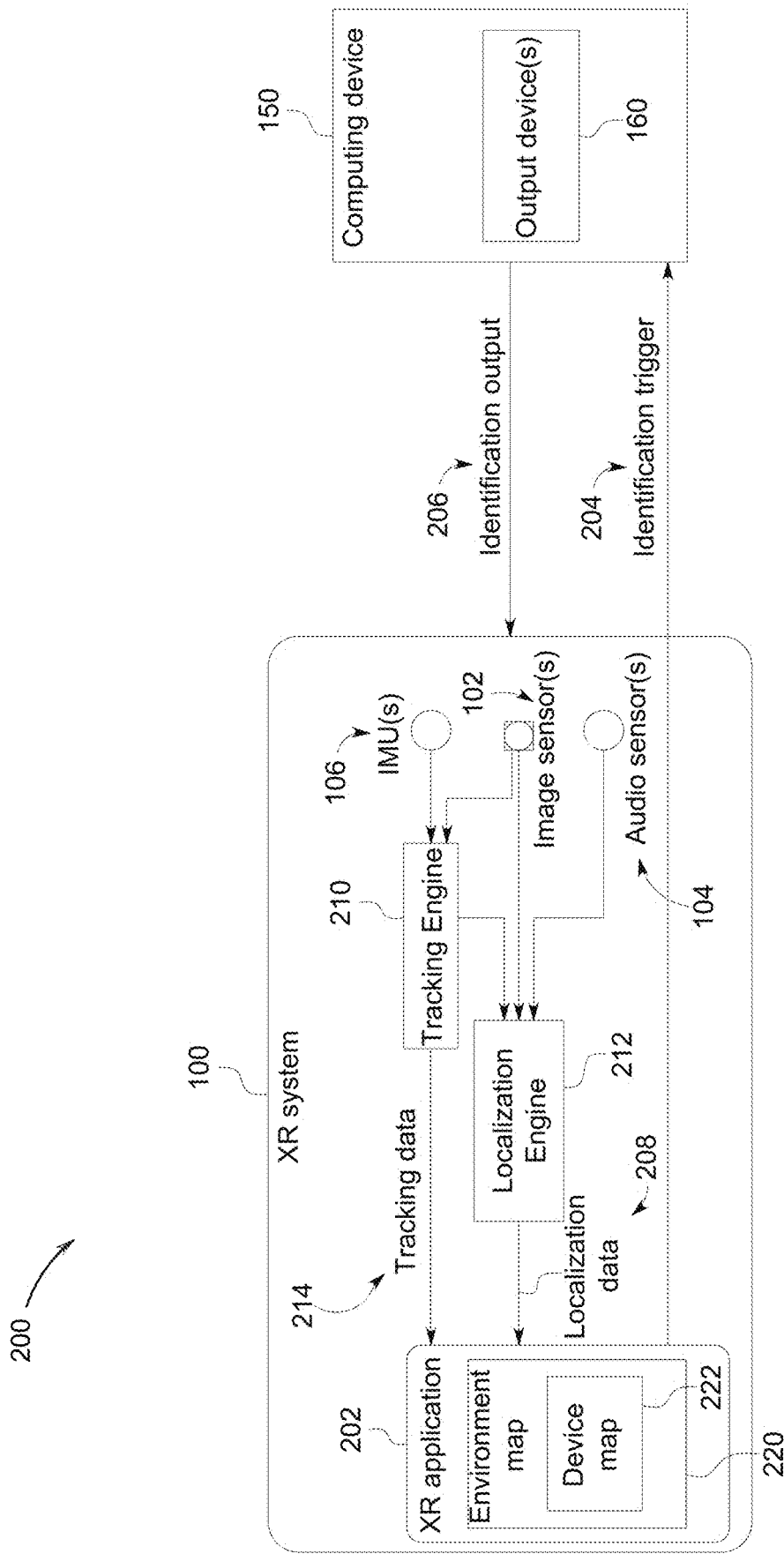
FIG. 2 is a diagram illustrating an example system for localizing and mapping a computing device, in accordance with some examples of the present disclosure.

FIG. 2 is a diagram illustrating an example system 200 for localizing and mapping the computing device 150. The computing device 150 can include a smart device (e.g., an IoT/connected device) such as, for example and without limitation, a smart wearable device (e.g., a smart watch, ring, bracelet, glove, medical/fitness/health tracker, etc.), a smart lock, a smart bicycle, a smart security system, a smart light, a smart hub, a smart camera, a smart refrigerator, a smart speaker, a smart plug, a smart assistant, a smart medical sensor, a smart television, a GPS device, a mobile computer, a video game console, a smart alarm, a smart scanner, a connected appliance, smart equipment, a smart home device, an embedded system, or any other smart, connected, and/or wireless device.

In the example shown in FIG. 2, the XR system 100 can send an identification trigger 204 to the computing device 150, to trigger the computing device 150 to output an identification output 206. The identification trigger 204 can include a message and/or command configured to trigger the computing device 150 to generate an identification output 206 that the XR system 100 can use to localize and map the computing device 150, as explained herein. In some cases, the XR system 100 can generate the identification trigger 204 in response to a user input requesting the identification trigger 204. For example, a user of the XR system 100 can select a control element on an XR application 202 at the XR system 100 to trigger the generation of the identification trigger 204. As another example, the user of the XR system 100 can provide a spoken input requesting the generation of the identification trigger 204, which the XR system 100 can recognize using one or more speech recognition algorithms.

In some cases, the identification trigger 204 can be generated in response to an event such as, for example, a trigger (e.g., a message, an operation, etc.) from the computing device 150, a determination (e.g., based on sensor data from one or more sensors) that the computing device 150 is nearby (e.g., within a proximity of the XR system 100), a time, etc. In some cases, the XR system 100 can output the identification trigger 204 periodically to trigger the identification output 206 when the computing device 150 is within a range and/or area, or when the computing device 150 and the XR system 100 are connected to a same local network and/or communicatively coupled (directly or indirectly) with each other. In other cases, the computing device 150 can trigger the XR system 100 to generate the identification trigger 204. For example, if the computing device 150 detects (e.g., based on sensor data) that the XR system 100 is within a certain range and/or area, the computing device 150 can send a message to the XR system 100 to trigger a discovery mode. The discovery mode can trigger the XR system 100 to generate the identification trigger 204 and look for the identification output 206 to localize and map the computing device 150.

The computing device 150 can receive the identification trigger 204 and output the identification output 206. The identification output 206 can include an output pattern that the XR system 100 can detect to localize and map the computing device 150. The output pattern (e.g., the identification output 206) can include a light, display, radio, Bluetooth, and/or audio pattern generated by the output device 160 of the computing device 150. For example, in some cases, the output device 160 can include light-emitting capabilities and the output pattern can include a dimming and brightening light pattern. The dimming and brightening pattern can be visible to the human eye (e.g., within the visible light spectrum) or imperceptible to the human eye in terms of wavelength and/or duration. In some cases, the output pattern can include IR light emitted by the output device 160. As another example, the output pattern can include a pattern of changes to a color temperature of light emitted by the output device 160. The color temperature pattern can be visible to the human eye or imperceptible (e.g., in wavelength and/or duration) to the human eye.

In other examples, the output pattern can include a display pattern presented/displayed by the output device 160. The display pattern can include, for example, a code (e.g., a QR code, a bar code, a key, etc.), an image, one or more characters, a rendered content item (e.g., a virtual content item, a digital object, a graphic, etc.), and/or any visual pattern. The display pattern be visible to the human eye or imperceptible (e.g., in wavelength and/or duration) to the human eye. In other examples, the output pattern can include an audio pattern (e.g., Morse code, a sound, and/or any other audio pattern), which can be perceptible to the human ear or imperceptible to the human ear in duration and/or frequency (e.g., ultrasound). In other examples, the output pattern can include a radio pattern (e.g., some special code, a pattern of on and off, or a pattern of low power and high power). In other examples, the output pattern can include any other type of pattern or combination of patterns, such as a combination of light, color temperature, visual, and/or audio patterns.

In some cases, the computing device 150 can encode an identification output 206 in a wireless signal(s) transmitted by the computing device 150. For example, the computing device 150 can use Bluetooth to communicate with the XR system 100. The computing device 150 can use Bluetooth to send a code or pattern representing the identification output 206 to the XR system 100. The XR system 100 can receive the Bluetooth communication from the computing device 150 and identify the code or pattern in the Bluetooth communication. The XR system 100 can use the identified code or pattern to localize the computing device 150 as further described herein.

In some cases, the computing device 150 can broadcast the identification output 206 with the output pattern periodically or in response to the identification trigger 204. In some cases, the computing device 150 can encode information in the identification output 206, such as information about the computing device 150, location information, an identifier, etc. The identification output 206 can be detected by a nearby device, such as the XR system 100, located within a proximity to the computing device 150 and/or a position relative to the computing device 150. In some examples, the distance and/or position of the nearby device (e.g., XR system 100) that allows detection of the identification output 206 by the nearby device can depend on the type of output pattern (e.g., light, audio, display, etc.), the configuration of the output pattern, how the output pattern is emitted, etc. For example, the XR system 100 can detect a light/display pattern from the computing device 150 when the light/display pattern and/or the output device 160 is/are within a view of one or more of the image sensors 102 of the XR system 100. As another example, the XR system 100 can detect an audio pattern from the computing device 150 when a distance between the output device 160 and the XR system 100 is such that the audio sensor 104 of the XR system 100 is able to detect/recognize the audio in the audio pattern emitted by the output device 160. As another example, the XR system 100 can detect a radio pattern from the computing device 150 when a distance between the output device 160 and the XR system 100 is such that the communication interface of the XR system 100 is able to detect/recognize the radio pattern emitted by the output device 160.

In some cases, the computing device 150 can vary the type of output pattern in the identification output 206 based on one or more factors such as, for example, a location of the computing device 150 (e.g., a private location, a public location, a location with a certain noise levels, a location with certain light or darkness levels, a location with a certain number or configuration of visual obstructions, etc.), a preference/setting indicating whether a nearby device should have a view to the output device 160, a type of environment, a size and/or configuration of a room where the computing device 150 is located, etc.

For example, if a preference setting indicates that the output pattern can be made detectable by nearby devices that do not have a view of the output device 160 (e.g., by nearby devices that do not have an image sensor with a view of the output device 160), the computing device 150 can broadcast an audio pattern and/or a light pattern that can be detected by a nearby device even if an image sensor of the nearby device does not have a view of the output device 160 (e.g., and thus cannot detect a display pattern presented on the output device 160). If a preference setting indicates that the output pattern instead should be detectable only by nearby devices that have a view of the output device 160 (e.g., by nearby devices having an image sensor(s) that has a view of the output device 160), the computing device 150 can output a display pattern that can be detected by a nearby device when an image sensor of the nearby device has a view of the output device 160 and thus the display pattern presented on the output device 160.

In some examples, the output pattern can include a sequence that can indicate to a device that detects the output pattern that the output pattern is an identification output. For example, the output pattern can include a sequence, such as a bit sequence, that distinguishes the output pattern from other types of light, audio, display, and/or similar types of patterns.

The XR system 100 can use one or more of the image sensors 102 and/or the audio sensor 104 to detect the identification output 206 from the computing device 150. For example, if the identification output 206 includes a light/display pattern, the XR system 100 can use one or more of the image sensors 102 to detect/capture the light/display pattern. The one or more of the image sensors 102 can capture an image(s) of the identification output 206, and the XR system 100 can use the image(s) to detect the identification output 206 (e.g., via a deep neural network, feature matching, cross-correlation of a digest of light statistics, etc.). If the identification output 206 includes an audio pattern, the XR system 100 can use the audio sensor 104 to detect/capture the audio pattern. The audio sensor 104 can capture audio data in the identification output 206 and use the audio data to detect the identification output 206 (e.g., via a deep neural network, audio feature matching, etc.).

In some examples, the XR system 100 can detect the identification output 206 when the XR system 100 is within a certain range of the computing device 150 and/or when the XR system 100 is at a certain location relative to the computing device 150. The proximity and/or location of the XR system 100 to be able to detect the identification output 206 can depend on one or more factors as previously explained, such as the type of output pattern (e.g., display, light, audio, etc.), an environment and/or location of the computing device 150 and/or the XR system 100, a configuration of the output pattern (e.g., a display size, a display location, an audio level, a light level, etc.), etc.

Once the one or more of the image sensors 102 and/or the audio sensor 104 has detected/captured the identification output 206, a localization engine 212 of the XR system 100 can perform localization to localize the identification output 206 and the computing device 150. In some examples, the localization can be based on the identification output 206 detected and tracking data 214 generated by the XR system 100. In some examples, a tracking engine 210 of the XR system 100 can use data from one or more of the image sensors 102, the audio sensor 104, and/or the IMU 106 to perform tracking to determine a position of the XR system 100 in an environment and/or relative to the computing device 150 and generate the tracking data 214. In some examples, the XR system 100 can use the tracking data 214 for XR functionalities such as, for example, localization, tracking, mapping, pose estimation, etc.

In some cases, the tracking data 214 can include data indicating a position and/or orientation of the XR system 100 in a scene/environment, a map (or portion of a map) of a scene/environment of the XR system 100. In some cases, a map in the tracking data 214 can map a 3D environment and locate one or more features/objects within the 3D environment, such as a position and/or orientation of the XR system 100 and/or the computing device 150. In some examples, the XR system 100 can use the tracking data 214 to provide XR functionalities and/or allow XR-based interactions with the scene/environment (and/or objects in the scene/environment), such as the computing device 150. For example, the XR system 100 can use the tracking data 214 to allow a user of the XR system 100 to interact with and/or control the computing device 150 using gestures, through an XR interface on the XR system 100, etc. The gestures can include, for example and without limitation, a hand gesture, an eye gaze, pointing to the computing device 150, touching the computing device 150, positioning the computing device 150 within a field-of-view (FOV) of an image sensor of the XR system 100, and/or any other gesture.

In some cases, the localization engine 212 can use the tracking data 214 and sensor data from the image sensors 102 and/or the audio sensor 104 to localize the computing device 150 and associate the computing device 150 with the identification output 206. The localization engine 212 can generate localization data 208 that localizes the identification output 206 and associates the identification output 206 with the computing device 150. An XR application 202 on the XR system 100 can use the localization data 208 to map the computing device 150. For example, the XR application 202 can use the localization data 208 to update a device map 222 in an environment map 220 to include the computing device 150 and a position of the computing device 150 within the 3D environment. The environment map 220 can map the 3D environment of the XR system 100 to identify features/objects and corresponding positions within the 3D environment. The device map 222 can include a map of computing devices (e.g., computing device 150) that have been localized and mapped within the environment map 220. In some examples, the device map 222 can identify localized devices and their estimated positions in 3D space.

The XR system 100 can use the environment map 220 and the device map 222 to enable a user of the XR system 100 to interact with and/or control the computing device 150 through an interface rendered on the XR system 100 (e.g., via the XR application 202), through motions, through gestures, and/or through any other XR inputs/actions. For example, the XR system 100 can use the environment map 220 and the device map 222 to allow a user of the XR system 100 to intuitively interact with the computing device 150 (e.g., via gestures, motions, physical interactions, etc.) using the XR system 100. To illustrate, in a non-limiting example, if the user points to a particular location in 3D space, the XR system 100 can use the environment map 220 and the device map 222 to determine that the computing device 150 is located at the particular location. Based on the mapped environment and the mapped location of the computing device 150 in the environment map 220 and the device map 222, the XR system 100 can associate the gesture (e.g., pointing to the particular location) with the computing device 150 even if there are other computing devices nearby and/or in the 3D environment. In some examples, the XR system 100 can interpret the user pointing to the particular location as a request to control or interact with the computing device 150. For example, the XR system 100 can interpret the user pointing to the particular location as a request to turn on/off a light of the computing device 150.

In some examples, the XR system 100 detect a user input (e.g., via a gesture, an interface rendered on the XR system 100, etc.) for controlling the computing device 150, and generate a command to control the computing device 150. The XR system 100 can send the command to the computing device 150 to trigger an operation/state at the computing device 150. In some examples, the XR system 100 can determine that the user input to control a device corresponds to the computing device 150 based on the location of the computing device 150 determined using the environment map 220 and the device map 222. For example, the XR system 100 can determine which device at a particular location the user wishes to control by determining that the computing device 150 is at the particular location based on the environment map 220 and the device map 222.

In some examples, a command generated by the XR system 100 for controlling the computing device 150 can include one or more instructions for adjusting one or more operations and/or states of the computing device 150. For example, in some cases, the XR application 202 can generate a command instructing the computing device 150 to turn off or on, adjust a light level of the computing device 150, play or stop a sound (e.g., a song, an alarm, a message, noise, a notification, etc.), change a power state of one or more components, start or stop a camera operation, generate an output, provide the XR system 100 a data feed (e.g., video, image, audio) from the computing device 150, start or stop an operation at the computing device 150, and/or stop or implement any other operations and/or states. The computing device 150 can receive the command from the XR system 100 and execute the command to implement one or more operations and/or states associated with the command.

In some cases, the XR system 100 can perform relocalization of the computing device 150 periodically, on demand, and/or upon a relocalization trigger. In some examples, the XR system 100 can track the location of the computing device 150 dynamically. For example, the XR system 100 can perform relocalization to track the location of the computing device 150 in case or if the location of the computing device 150 has changed after a previous localization. In some cases, the XR system 100 can perform a mapping process periodically and/or as needed. In some examples, when the XR system 100 believes it is near a previously-mapped device (e.g., computing device 150), the XR system 100 can trigger the identification output to check if the device is still in the previously-mapped location. If the XR system 100 determines that the device is not located where expected (e.g., in the previously-mapped location), the XR system 100 can trigger the identification output one or more times or periodically. When the XR system 100 finds the device (e.g., computing device 150) based on an identification output, the XR system 100 can update the location of the device in the device map 222.

In another example, the user of the XR system 100 can execute an action indicating a desire to interact with the computing device 150, such as pointing to the computing device 150, maintaining an eye gaze towards the computing device 150, maintaining a head pose towards the computing device 150, touching the computing device 150, etc. In some cases, the action can identify, suggest or imply a location of the computing device 150. If the computing device 150 is not mapped at such location (or the computing device 150 is not mapped at such location), the XR system 100 can trigger an identification output for any known/mapped devices (e.g., for all devices in the device map 222) until a matching identification output is detected. The XR system 100 can then use the detected identification output to localize the computing device 150 and update the device map 222 to include the computing device 150 at the determined location of the computing device 150.

In some cases, the computing device 150 can trigger a relocalization by the XR system 100. In some examples, the computing device 150 can detect when the location of the computing device 150 has changed and trigger a relocalization by the XR system 100. For example, the computing device 150 can detect that its location has changed based on a network signal of the computing device 150 and/or a characteristic (e.g., signal strength, etc.) of a network signal of the computing device 150, sensor data (e.g., image data captured by an image sensor of the computing device 150, inertial data captured by an inertial measurement unit of the computing device 150, etc. In some cases, when the computing device 150 detects that its location has changed, the computing device 150 can notify the XR system 100 that the location of the computing device 150 has changed. For example, the computing device 150 can send a wireless signal (e.g., a Bluetooth communication, a WiFi communication, etc.) to the XR system 100. The wireless signal can include an indication (e.g., data, a pattern, etc.) of the change in the location of the computing device 150. In another example, when the computing device 150 detects that its location has changed, the computing device 150 can output an identification output for detection by the XR system 100. The identification output can trigger the relocalization by the XR system 100.

As previously noted, the XR system 100 can use image/video data captured by one or more of the image sensors 102 and/or audio data captured by the audio sensor 104 to detect the identification output 206 from the computing device 150. In some examples, the XR system 100 can detect the identification output 206 using a deep neural network. For example, to detect an identification output including a light, display, radio, and/or audio pattern, the XR system 100 can use a deep neural network that is pre-trained on a set of image and/or audio data including examples of relevant identification outputs. In some examples, the XR system 100 can detect the identification output 206 via cross-correlation of a digest of audio and/or light statistics (e.g., statistics of light levels/patterns, statistics of audio patterns/sequences, etc.) exceeding a predetermined threshold. In some cases, the XR system 100 can detect the identification output 206 via audio or visual feature matching. For example, the XR system 100 can identify keypoints in an image capturing a visual pattern in the identification output 206, such as a displayed code, and extract features in the image corresponding to the visual pattern. The XR system 100 can generate feature descriptions for the extracted features. The XR system 100 can match the keypoints, features, and/or feature descriptions with keypoints, features, and/or feature descriptions associated with the visual pattern. The XR system 100 can detect the visual pattern based on such feature matching. The XR system 100 can perform similar feature matching with audio data to detect audio outputs.

Figure 3:
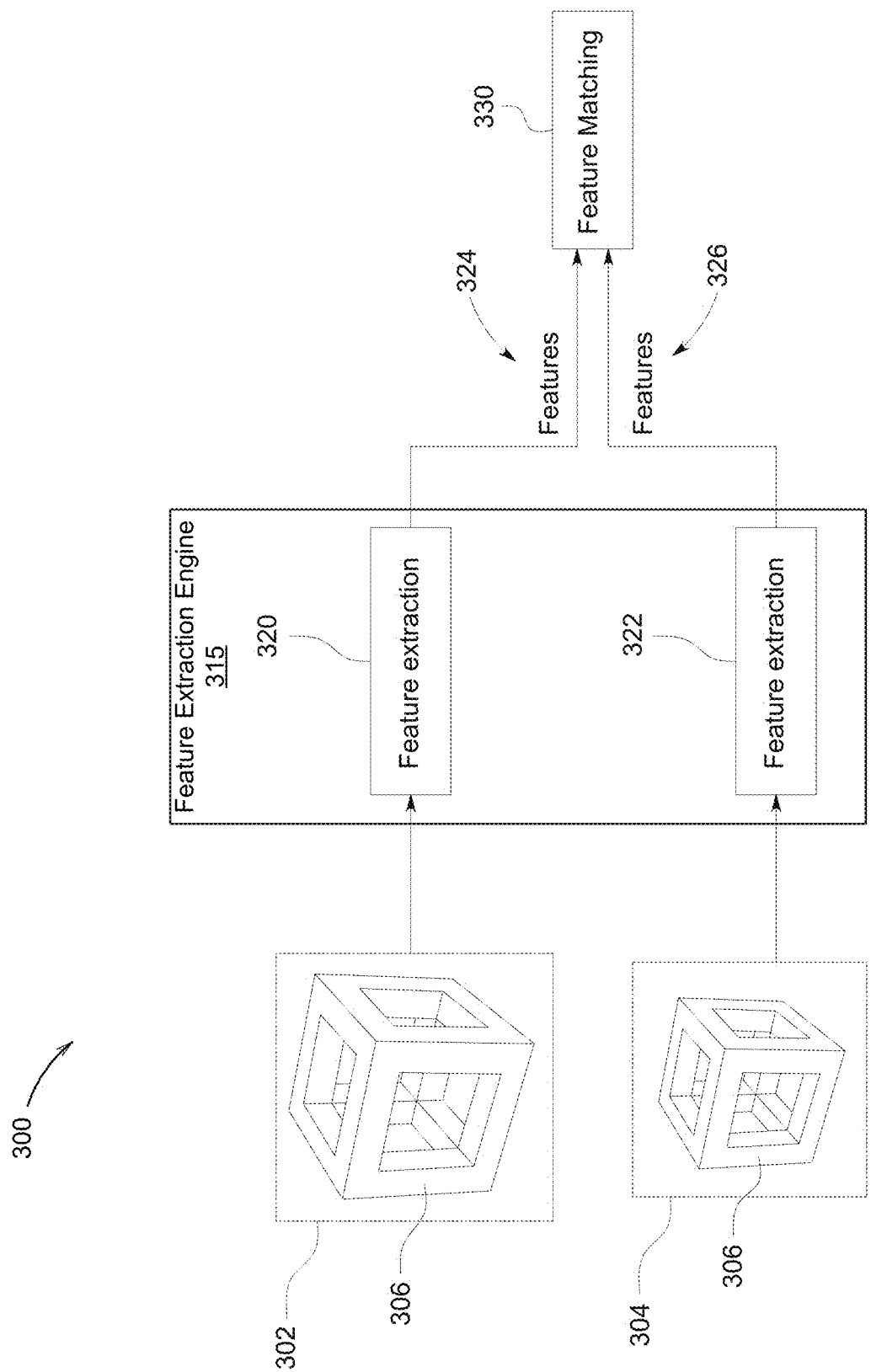
FIG. 3 is a diagram illustrating an example process for visual feature matching to detect a visual pattern in an identification output from the computing device, in accordance with some examples of the present disclosure.

FIG. 3 is a diagram illustrating an example process 300 for visual feature matching to detect a visual pattern in an identification output from the computing device 150. In this example, a feature extraction engine 315 of the XR system 100 can process an image 302 of a visual object 306 associated with a predetermined identification output, and perform a feature extraction 320 to extract features 324 from the image 302. The features 324 can include a feature vector corresponding to features of the visual object 306 and descriptions of the features in the feature vector.

The XR system 100 can capture an image 304 of an identification output from the computing device 150. The image 304 can capture the visual object 306 included in the identification output from the computing device 150. The XR system 100 can input the image 304 into the feature extraction engine 315 to perform feature extraction 322 to extract features 326 from the image 304. The features 326 can include a feature vector corresponding to features of the visual object 306 and descriptions of the features in the feature vector.

The XR system 100 can perform a feature matching 330 using the features 324 from the feature extraction 320 and the features 326 from the feature extraction 322, to determine whether the features 324 and the features 326 match. The feature matching 330 can compare the features 324 and the features 326 to determine if they both correspond to the same visual object (e.g., visual object 306). If the feature matching 330 determines that the features 324 and the features 326 correspond to the same visual object, the XR system 100 can determine that the visual object 306 corresponds to an identification output. The XR system 100 can detect and/or identify the identification output from the computing device 150 based on the visual object 306 in the identification output.

In some cases, if the image 302 and the image 304 capture the visual object 306 from different angles/views and the visual object 306 is visually identifiable from both angles/views, the XR system 100 can perform a transform, such as a homography transform, to obtain a matching feature vector between the image 302 and the image 304. In some examples, the XR system 100 can determine correspondences between the features in the image 302 and the image 304 to determine a match.

In some cases, the features 324 can include the 3D locations of the features 324, and the features 326 can include the 3D locations of the features 326. In some cases, the XR system 100 can use the 3D locations of the features to determine correspondences between the features (e.g., to match the features). In some cases, the XR system 100 can use the 3D locations of the features to assist in localizing an identification output associated with the features 326.

Figure 4:
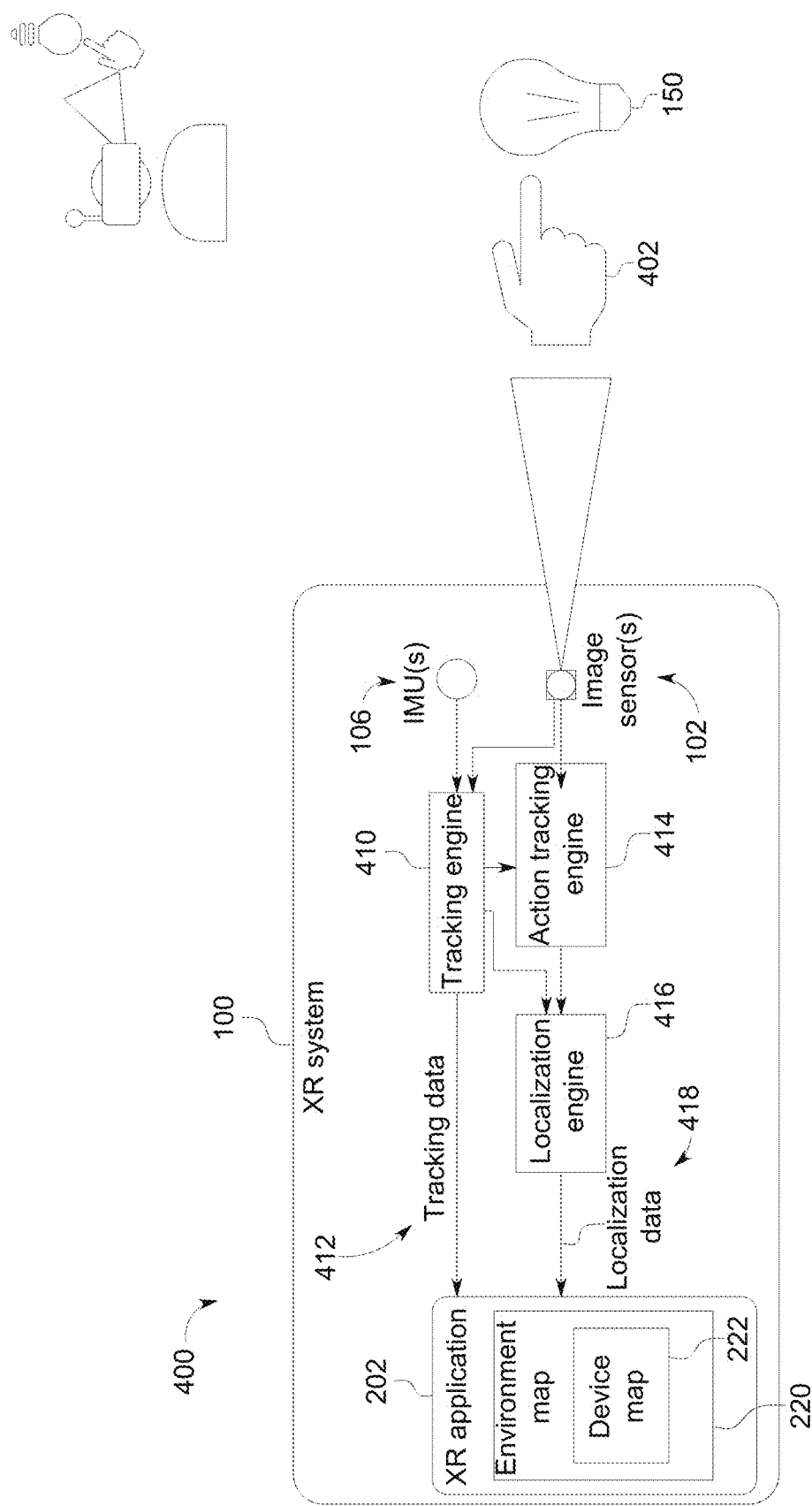
FIG. 4 is a diagram illustrating an example system for localizing a computing device based on a user gesture, in accordance with some examples of the present disclosure.

FIG. 4 is a diagram illustrating an example system 400 for localizing a computing device 150 based on a user gesture. In this example, the user gesture is a hand gesture (e.g., pointing at the computing device 150 or touching the computing device 150 with a finger), and the localization uses hand tracking. However, in other examples, the user gesture can be any other type of gesture from the user and the localization can use any other relevant tracking of the user. For example, in some cases, the gesture can be maintaining an eye gaze towards the computing device, positioning the computing device 150 within a field-of-view of an image sensor of the XR system 100, maintaining a certain head pose, etc. In some cases, the tracking can include eye/gaze tracking, head pose tracking, and/or other gesture tracking.

A tracking engine 410 of the XR system 100 can use data from the image sensors 102 and the IMU 106 to track the location and pose of the XR system 100 as previously described with respect to the tracking engine 210 shown in FIG. 2. The tracking engine 410 can generate tracking data 412, which can include the location and pose of the XR system 100 and a map of the 3D environment, as previously described with respect to the tracking data 214 shown in FIG. 2.

A user of the XR system 100 can use a hand 402 to point to the computing device 150 (and/or touch the computing device 150 with a finger of the hand 402) for localization of the computing device 150. In some examples, rather than the XR system 100 sending an identification trigger to trigger the computing device 150 to generate an identification output for localizing the computing device 150, the user can trigger the localization and mapping of the computing device 150 by the hand gesture shown in FIG. 4 (e.g., by pointing to the computing device 150 and/or touching the computing device 150). In some cases, the XR system 100 can dynamically detect the hand gesture and trigger the localization. In other cases, the user of the XR system 100 can trigger the detection of the hand gesture (and the localization) by interacting with an interface rendered by the XR application 202, such as selecting a control or setting in an interface rendered by the XR application 202.

To localize the computing device 150, one or more of the image sensors 102 of the XR system 100 can capture an image of the hand 402 performing a gesture, such as pointing to the computing device 150, touching the computing device 150, etc. In other examples, to localize the computing device 150, the one or more image sensors 102 can capture an image of the computing device 150 and/or any other part of the user. For example, the one or more image sensors 102 can capture an image of the computing device 150 after being positioned by the user within a field-of-view of the one or more image sensors 102. As another example, the one or more image sensors 102 can capture one or more images of the user's eyes or head to track an eye gaze and/or head pose of the user.

The XR system 100 can use an action tracking engine 414 for action tracking (e.g., tracking an action, activity, or event). For example, the action tracking engine 414 can use an image of the hand 402 (and/or any other images as previously mentioned) to perform hand tracking to estimate a pose of the hand 402 in 3D space. In some examples, the XR system 100 can also use the tracking data 412 from the tracking engine 410 for the action tracking (e.g., hand tracking, head pose tracking, eye gaze tracking, gesture tracking, computing device tracking, tracking other actions by the user, etc.). For example, the action tracking engine 414 of the XR system 100 can perform hand tracking using an image of the hand 402 from one or more of the image sensors 102, a 3D map of the environment from the tracking data 412, and a location and pose of the XR system 100 identified in the tracking data 412.

The localization engine 416 of the XR system 100 can use the action tracking results (e.g., hand tracking, object tracking, user action tracking, gesture tracking, etc.) from the action tracking engine 414 and the tracking data 412 from the tracking engine 410 to perform a localization of the computing device 150. The localization can identify the location of the computing device 150 in the 3D environment/space. Based on the localization, the XR system 100 can generate localization data 418 identifying the location of the computing device 150. The XR application 202 can use the localization data 418 to update the device map 222 to include the location of the computing device 150. In some examples, the XR application 202 can tag a location in the device map 222 corresponding to the determined location of the computing device 150 with the computing device 150 identified by the XR system 100. The XR system 100 can use the updated device map to enable controlling and interacting with the computing device 150, as previously described.

In some cases, the localization engine 416 can localize the computing device 150 using triangulation or any localization algorithm. In some examples, to localize the computing device 150, the localization engine 416 can correlate a region-of-interest (ROI) tracked by the tracking engine 414 to the environment map 220 in order to correlate an action (e.g., a gesture, etc.) captured in the ROI with the 3D environment/space. For example, the localization engine 416 can use the tracking results (e.g., determined pose information, motion information, etc.) from the action tracking engine 414 and the tracking data 412 from the tracking engine 410 to determine an action (e.g., a gesture, etc.) captured in an ROI and in some cases corresponding motion and/or position information. In some examples, the action can indicate a location of the computing device 150. The localization engine 416 can use the corresponding motion and/or position information to determine a position of the action and/or an object associated with the action (e.g., a hand, a finger, a head, eyes, another user body part, the computing device 150, and/or any other object) within the 3D environment/space. examples the localization engine 416 can use the position of the action and/or associated object to determine the location of the computing device 150 within a coordinate system of the XR system 100. In some aspects, the localization engine 416 can use the location of the computing device 150 within the coordinate system of the XR system 100 to correlate the computing device 150 with a location in the environment map 220 and/or the device map 222.

In some cases, the XR system 100 can use one or more computing devices to localize the one or more computing devices and/or the XR system 100 relative to each other, and map the one or more computing devices. For example, the XR system 100 can use one or more computing devices to localize the XR system 100 and the one or more computing devices relative to the XR system 100, and map the one or more computing devices based on the localization information. In some examples, the XR system 100 can remotely trigger a computing device(s) to enter mapping mode. Based on the trigger, the computing device(s) can begin looking for an identification output from the XR system 100. Upon detecting the identification output from the XR system 100, the computing device(s) can localize itself relative to the XR system 100 and relay the localization information to the XR system 100. The XR system 100 can translate the localization information to its map of devices (e.g., device map 222) and identify/associate the computing device(s) with the determined location(s).

Figure 5:
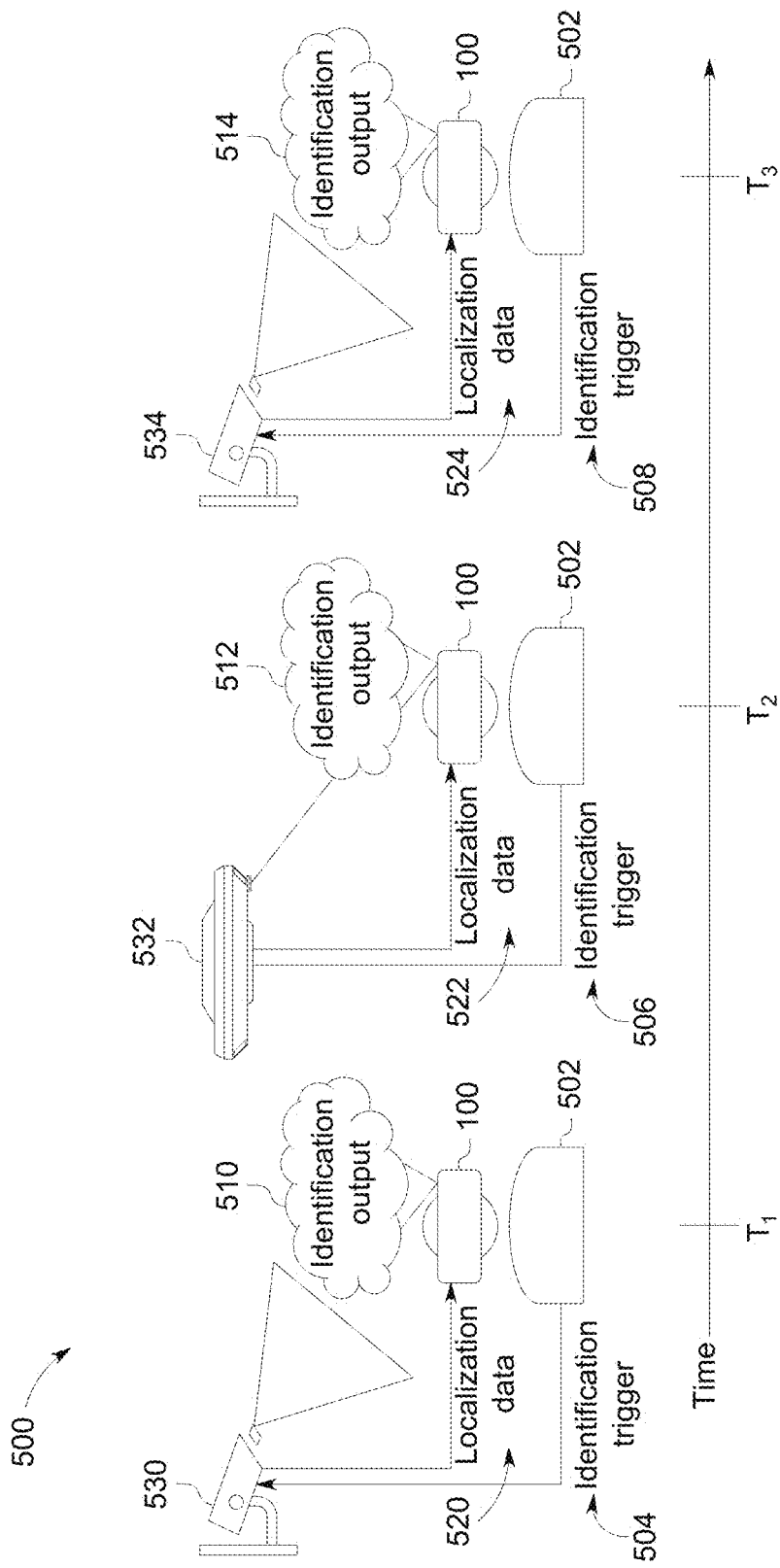
FIG. 5 is a diagram illustrating an example localization by an extended reality device using other computing devices, in accordance with some examples of the present disclosure.

FIG. 5 is a diagram illustrating an example localization 500 by the XR system 100 using computing devices 530, 532, and 534. The computing devices 530, 532, and 534 can include smart devices (e.g., IoT/connected devices, etc.), such as computing device 150. Moreover, each of the computing devices 530, 532, and 534 can include one or more sensors such as, for example and without limitation, an image sensor(s), an audio sensor(s), an IMU, a radar, a pressure sensor, etc. In this illustrative example, the computing devices 530 and 534 are shown as camera devices with image sensors to capture image/video data, and the computing device 532 is shown as a smart television with at least one audio sensor. However, in other examples, the computing devices 530, 532, and 534 can include other types of devices with other types of sensors (instead of or in addition to the sensors noted above).

The computing devices 530, 532, and 534 can use their sensors to detect an identification output from the XR system 100 and localize themselves relative to the XR system 100, as further explained herein. For example, as a user 502 wearing the XR system 100 moves within a FOV of each computing device from the computing devices 530, 532, and 534, the computing device can detect an identification output from the XR system 100 and localize itself relative to the XR system 100. The computing device can send the localization information to the XR system 100, which can translate the localization information to the device map (e.g., device map 222) at the XR system 100 to obtain a mapping of each computing device.

As shown in FIG. 5, the XR system 100 can send an identification trigger 504 to the computing device 530 to remotely trigger the computing device 530 to enter a mapping mode. In other examples, the computing device 530 can enter the mapping mode periodically or based on another event/trigger. For example, in some cases, the computing device 530 can enter a mapping mode upon detecting that the XR system 100 is within a FOV of the computing device 530, upon detecting that the XR system 100 is within a threshold range of the computing device 530, upon detecting a spoken command from the user 502 requesting the computing device 530 to enter mapping mode, upon detecting speech from the user 502 indicating that the user 502 may be using the computing device 530 and may be within a proximity to the computing device 530, upon receiving a communication from another computing device (e.g., computing device 532, computing device 534) identifying a detected location of the XR system 100 that indicates that the XR system 100 may be moving towards a location of the computing device 530 (and/or may be within a FOV and/or range of the computing device 530 at a future time and/or within a future time window), and/or upon any other event/trigger.

After sending the identification trigger 504, the XR system 100 can generate the identification output 510 for detection by the computing device 530. In this example, the identification output 510 represent or includes a pattern displayed by the XR system 100 (e.g., by a display on the XR system 100 and visible to the computing device 530) or on the XR system 100 (e.g., a pattern on the XR system 100 itself). However, in other examples, the identification output 510 can include any other pattern (e.g., a light pattern, an audio pattern, a combination of patterns, etc.) as previously described with respect to the identification output 206 shown in FIG. 2.

In some examples, the XR system 100 can output the identification output 510 once after sending the identification trigger 504. For example, the XR system 100 can output the identification output 510 and may not output an additional identification output until a certain amount of time has lapsed or until the XR system 100 moves to a different location/position (and/or a threshold distance and/or position change). In some cases, the XR system 100 can output the identification output 510 and maintain the identification output 510 (e.g., keep emitting the identification output 510, keep displaying the identification output 510, etc.) for a certain period of time. In other examples, the XR system 100 can output the identification output 510 multiple times (e.g., periodically, etc.).

Upon receiving the identification trigger 504 (or upon detecting any other event/trigger configured to trigger the mapping mode as previously described), the computing device 530 can enter mapping mode. Once the computing device 530 enters mapping mode, the computing device 530 can begin searching for the identification output 510 from the XR system 100. As shown, at time $t_1$, the XR system 100 is within a FOV of the computing device 530. Since the identification output 510 in this example is a display pattern, the computing device 530 can detect the identification output 510 when the XR system 100 is within the FOV of the computing device 530 at time $t_1$. However, in other examples, the identification output 510 can include another type of pattern that can be detected when the XR system 100 is not within the FOV of the computing device 530, such as an audio pattern, a pattern of output light levels, etc. In such examples, the computing device 530 may detect the identification output 510 when the XR system 100 is within a certain range (which can vary based on one or more factors as previously explained) of the computing device 530, even if the XR system 100 is not within the FOV of the computing device 530.

The computing device 530 can detect the identification output 510 from the XR system 100 and use the identification output 510 to localize itself in 3D space relative to the XR system 100. For example, the computing device 530 can localize its relative location to the XR system 100 within the internal coordinate system of the computing device 530. In some examples, the computing device 530 can identify and/or localize the XR system 100 based on the identification output 510 and sensor data from one or more sensors of the computing device 530. In some cases, the computing device 530 can use one or more sensors of the computing device 530 to track/map its location in 3D space and determine its location relative to the XR system 100 within the internal coordinate system of the computing device 530. In other cases, the computing device 530 can be preconfigured with location information identifying its location in 3D space. In such examples, the computing device 530 can use the preconfigured location information to determine its location relative to the XR system 100.

After the computing device 530 localizes itself relative to the XR system 100, the computing device 530 can send localization data 520 to the XR system 100. The localization data 520 can indicate the location of the computing device 530 relative to the XR system 100. For example, the localization data 520 can indicate that, within the coordinate system of the computing device 530, the computing device 530 is at a certain distance above/below the XR system 100 and/or a certain distance away from the XR system 100 (e.g., at a certain range/proximity). In some cases, when indicating a distance away from the XR system 100, the localization data 520 can also indicate a direction of the distance away, such as behind, in front, left, or right; north, south, east, or west; or any other indication of a direction. In some examples, the localization data 520 can indicate one or more coordinates of the location of the computing device 150 in 3D space.

The XR system 100 can receive the localization data 520 and use the localization data 520 to locate and map the computing device 530. In some examples, the XR system 100 can also use the localization data 520 to localize itself relative to the computing device 530. Based on the location of the computing device 530 relative to the XR system 100, the XR system 100 can update the device map (e.g., device map 222) of the XR system 100 to include an indication of the location of the computing device 530. In some examples, the XR system 100 can translate the location information in the localization data 520 to its own coordinate system and map. For example, if the localization data 520 indicates the computing device 530 is at a certain distance above/below the XR system 100 and a certain distance away from the XR system 100, the XR system 100 can use such information to determine that the computing device 530 is a certain distance above/below and a certain distance away from a current location of the XR system 100. The XR system 100 can determine the location of the computing device 530 within the internal coordinate system of the XR system 100 and update the device map of the XR system 100 to associate that location with the computing device 530.

At time $t_2$, the XR system 100 can send an identification trigger 506 to the computing device 532 to remotely trigger the computing device 532 to enter a mapping mode. As previously noted, in other examples, the computing device 532 can enter the mapping mode periodically or based on another event/trigger. After sending the identification trigger 506, the XR system 100 can generate the identification output 512 for detection by the computing device 532. In this example, the identification output 512 represents or includes an audio pattern emitted by the XR system 100 (e.g., by a speaker on the XR system 100). However, in other examples, the identification output 512 can include any other pattern (e.g., a light pattern, a display pattern, a combination of patterns, etc.) as previously described.

Upon receiving the identification trigger 506 (or upon detecting any other event/trigger configured to trigger the mapping mode as previously described), the computing device 532 can enter mapping mode. Once the computing device 532 enters mapping mode, the computing device 532 can begin searching for the identification output 512 from the XR system 100. In this example, the computing device 532 can use an audio sensor to capture/detect the audio pattern in the identification output 512. The computing device 532 can detect the identification output 512 from the XR system 100 and use the identification output 512 to localize itself in 3D space relative to the XR system 100, as previously described.

After the computing device 532 localizes itself relative to the XR system 100, the computing device 532 can send localization data 522 to the XR system 100. The localization data 522 can indicate the location of the computing device 532 relative to the XR system 100. The XR system 100 can receive the localization data 522 and use the localization data 522 to locate and map the computing device 532. In some examples, the XR system 100 can also use the localization data 522 to localize itself relative to the computing device 532.

Based on the location of the computing device 532 relative to the XR system 100, the XR system 100 can then update the device map (e.g., device map 222) of the XR system 100 to include an indication of the location of the computing device 532. In some examples, the XR system 100 can translate the location information in the localization data 522 to its own coordinate system and map. For example, if the localization data 522 indicates the computing device 532 is at a certain distance above/below the XR system 100 and a certain distance away from the XR system 100, the XR system 100 can use such information to determine that the computing device 532 is a certain distance above/below and a certain distance away from a current location of the XR system 100. The XR system 100 can determine the location of the computing device 532 within the internal coordinate system of the XR system 100 and update the device map of the XR system 100 to associate that location with the computing device 532.

To initiate an attempt to localize the computing device 534, the XR system 100 can send an identification trigger 508 to the computing device 534 to remotely trigger the computing device 534 to enter a mapping mode. In other examples, the computing device 534 can enter the mapping mode periodically or based on another event/trigger.

After sending the identification trigger 508, the XR system 100 can generate the identification output 514 for detection by the computing device 534. In this example, the identification output 514 represents or includes a light pattern emitted by the XR system 100 (e.g., by a light-emitting device on the XR system 100). However, in other examples, the identification output 514 can include any other pattern (e.g., a display pattern, an audio pattern, a combination of patterns, etc.) as previously described.

Upon receiving the identification trigger 508 (or upon detecting any other event/trigger configured to trigger the mapping mode as previously described), the computing device 534 can enter mapping mode. Once the computing device 534 enters mapping mode, the computing device 534 can begin searching for the identification output 514 from the XR system 100. As shown, at time $t_3$, the computing device 534 can detect the identification output 514 from the XR system 100. The computing device 534 can detect the identification output 514 from the XR system 100 and use the identification output 514 to localize itself in 3D space relative to the XR system 100. For example, the computing device 534 can localize its relative location to the XR system 100 within the internal coordinate system of the computing device 534.

After the computing device 534 localizes itself relative to the XR system 100, the computing device 534 can send localization data 524 to the XR system 100. The localization data 524 can indicate the location of the computing device 534 relative to the XR system 100. The XR system 100 can receive the localization data 524 and use the localization data 524 to locate and map the computing device 534. In some examples, the XR system 100 can also use the localization data 524 to localize itself. Based on the location of the computing device 534 relative to the XR system 100, the XR system 100 can update the device map (e.g., device map 222) of the XR system 100 to include an indication of the location of the computing device 534. In some examples, the XR system 100 can translate the location information in the localization data 524 to its own coordinate system and map. The XR system 100 can determine the location of the computing device 534 within the internal coordinate system of the XR system 100 and update the device map of the XR system 100 to associate that location with the computing device 534.

In some examples, the XR system 100 can implement the localization 500 to efficiently localize and map a number of devices. For example, if a user wants to localize all the smart devices in a particular location, such as the user's home, the user can move around that location while wearing the XR system 100. The XR system 100 can perform the localization 500 to localize the smart devices as the user moves to different areas of that location. The XR system 100 can use the localization information to map each of the smart devices in the particular location. Knowing the location of each of the smart devices based on the mapping of the smart devices, the XR system 100 can allow the user to use the XR system 100 to interact with and control any of the smart devices. In some examples, the user wearing the XR system 100 can use gestures and/or input devices to interact with or control any of the smart devices using the XR system 100. In some examples, the user wearing the XR system 100 can interact with an interface on the XR system 100 to control any of the smart devices or otherwise interact with any of the smart devices.

While the example localization 500 shown in FIG. 5 uses multiple computing devices (e.g., computing devices 530, 532, and 534), other examples of the localization 500 can be performed using the XR system 100 and a single other computing device (e.g., computing device 530, computing device 532, or computing device 534). In other examples, the localization 500 shown in FIG. 5 can be implemented using more or less computing devices than shown in FIG. 5.

Figure 6:
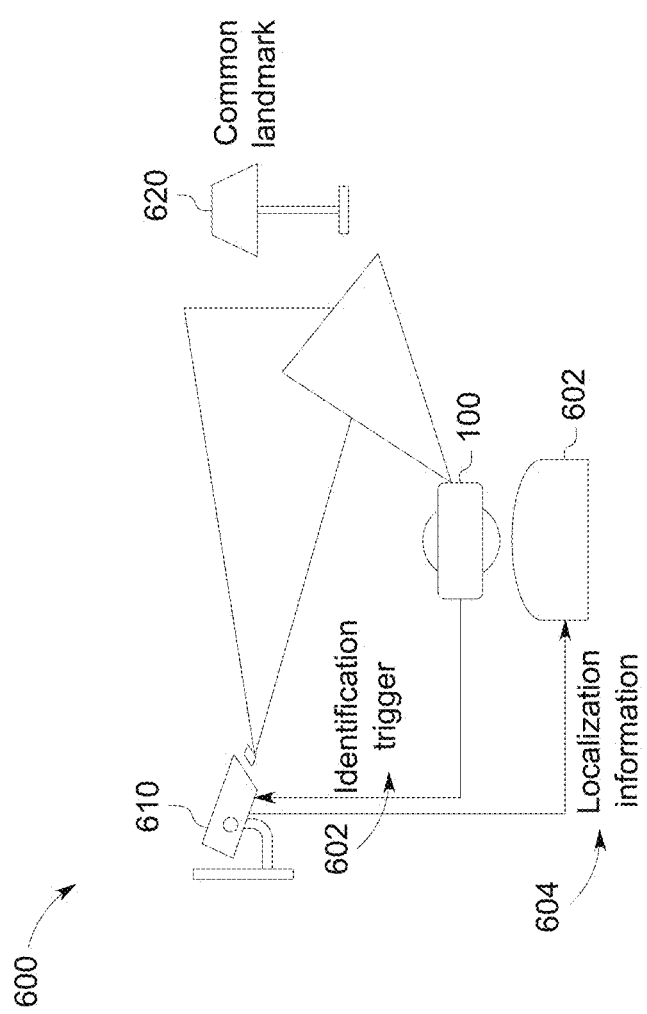
FIG. 6 is a diagram illustrating an example joint localization by devices based on a common landmark, in accordance with some examples of the present disclosure.

FIG. 6 is a diagram illustrating an example joint localization 600 by devices based on a common landmark. The XR system 100 can send an identification trigger 602 to the computing device 610 to trigger the computing device 610 to enter a mapping mode. In this example, the computing device 610 represents a camera device. However, the computing device 610 can include any smart device (e.g., IoT/connected device, etc.), such as computing device 150.

The computing device 610 can receive the identification trigger 602 from the XR system 100 and enter in mapping mode. In mapping mode, the computing device 610 can localize the landmark 620 relative to its own coordinate system. For example, the computing device 610 can obtain image data that captures the landmark 620 and process the image data using one or more localization algorithms to determine the location of the landmark 620 relative to the computing device 610. The computing device 610 can then send location information 604 to the XR system 100. In some cases, the location information 604 can include localization data as previously described. In some examples, the location information 604 can describe and/or identify the location of the landmark 620 relative to the computing device 610. The XR system 100 can use the location of the landmark 620 described and/or identified in the location information 604 to localize the computing device 610, as further described herein. In some cases, the location information 604 can describe and/or identify the location of the landmark 620 within or relative to a coordinate system of the computing device 610 or the XR system 100. For example, the location information 604 can describe and/or identify the location of the landmark 620 in a coordinate system of the computing device 610. The XR system 100 can translate the location of the landmark 620 from the coordinate system of the computing device 610 to a coordinate system of the XR system 100, as further explained below.

The XR system 100 can also localize the landmark 620 to determine the location of the landmark 620 relative to the XR system 100 and/or a coordinate system of the XR system 100. The XR system 100 can use the location information 604 from the computing device 610 and the location of the landmark 620 relative to the XR system 100 and/or the coordinate system of the XR system 100 to localize the computing device 610. In some examples, the XR system 100 can use the location of the landmark 620 relative to the XR system 100 (and/or a coordinate system of the XR system 100) to translate the location of the landmark 620 relative to the computing device 610 (and/or a coordinate system of the computing device 610) to a location of the computing device within the coordinate system of the XR system 100. For example, the XR system 100 can determine the location of the computing device 610 relative to the coordinate system of the XR system 100 based on the location of the landmark 620 relative to the coordinate system of the XR system 100 and the location of the landmark 620 relative to the coordinate system of the computing device 610. In this example, the XR system 100 can translate the location of the computing device 610 relative to the coordinate system of the computing device 610 to the location of the computing device 610 relative to the coordinate system of the XR system 100.

Based on the location of the computing device 610 relative to the XR system 100, the XR system 100 can map the computing device 610. For example, the XR system 100 can update a device map (e.g., device map 222) at the XR system 100 to associate the location of the computing device 610 with the computing device 610.

In some cases, the location information 604 from the computing device 610 can include a feature vector describing features of the landmark 620. For example, the computing device 610 can extract features corresponding to the landmark 620 from the image data capturing the landmark 620. The computing device 610 can then provide the extracted features to the XR system 100. The XR system 100 can use the features from the computing device 610 to verify that the location information 604 from the computing device 610 corresponds to the landmark 620 and ensure that the localization information determined by the XR system 100 for a landmark (e.g., landmark 620) and the location information 604 from the computing device 610 correspond to the same landmark. For example, the XR system 100 can determine a feature vector associated with the landmark 620. The XR system 100 can compare the feature vector it estimates with a feature vector from the computing device 610. The XR system 100 can verify that the feature vector from the computing device 610 corresponds to a same landmark as the feature vector estimated by the XR system 100. For example, the XR system 100 can determine if the feature vectors match and/or have correspondences.

The XR system 100 can verify that the feature vectors correspond to a same landmark to ensure the XR system 100 does not rely on the wrong localization information to localize the computing device 610. For example, the XR system 100 can ensure that it localizes the computing device 610 based on the locations of the XR system 100 and the computing device 610 relative to a same landmark.

Figure 7:
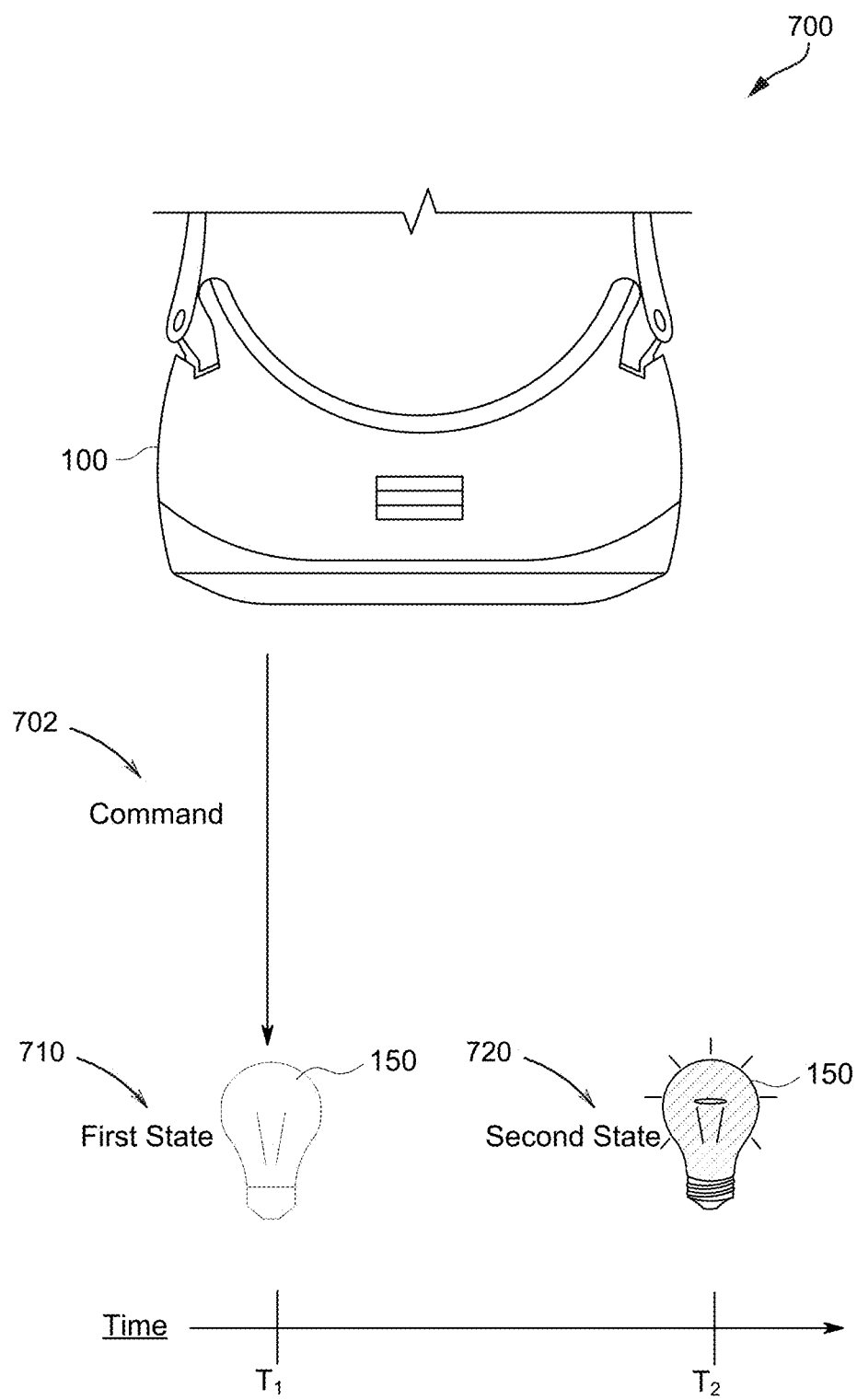
FIG. 7 is a diagram illustrating an example use case for controlling a computing device using an extended reality device, in accordance with some examples of the present disclosure.

As previously explained, the XR system 100 can map controllable devices to allow a user to control and/or interact with the controllable devices via the XR system 100 using certain types of user inputs such as gestures and XR inputs. FIG. 7 is a diagram illustrating an example use case 700 for controlling the computing device 150 using the XR system 100. In this example, the computing device 150 represents a smart light bulb. The XR system 100 can detect an input from a user of the XR system 100 requesting to change a state of the computing device 150 from a first state 710 to a second state 720.

For example, the XR system 100 can detect a gesture by the user, such as pointing (e.g., via a finger, controller, hand, head, input device, etc.) to the computing device 150, waving a hand in a certain way and/or location (e.g., near the computing device 150), maintaining an eye gaze towards the computing device 150, and/or any other gesture. The XR system 100 can interpret the gesture as an input to adjust the state of the computing device 150 from the first state 710 to the second state 720. In another example, the XR system 100 can receive an input from the user through an interface rendered by the XR system 100. The input from the user can include a request to adjust the state of the computing device 150 from the first state 710 to the second state 720.

Based on the input from the user, the XR system 100 can generate a command 702 to trigger the computing device 150 to adjust the state of the computing device 150 from the first state 710 to the second state 720. The XR system 100 can send the command 702 to the computing device 150. The computing device 150 can receive the command 702 and execute the command 702 to change the state of the computing device 150 to the second state 720.

As previously noted, the command 702 includes a command to change the state of the computing device 150 from the first state 710 to the second state 720. The first state 710 illustrated in this example is an off state and the second state 720 illustrated in this example is an on state. Thus, as shown in FIG. 7, the XR system 100 can use the command 702 to turn on the smart light bulb represented by the computing device 150. In other examples, the command 702 can include a command to change an operation/state of the smart light bulb represented by the computing device 150 to any other state. For example, the command 702 can include a command to turn off the smart light bulb (from an on state), change a light level of the smart light bulb, change a color temperature of the smart light bulb, start/stop an audio playback (e.g., sound, music, etc.) if the smart light bulb has audio capabilities, trigger a communication and/or connection by the smart light bulb with another device(s), generate a particular light pattern(s), or implement any other state/operation or combination of states/operations.

The XR system 100 can similarly use commands to control a state/operation of any other type of computing device 150, such as for example, a smart speaker, a smart television, a smart lock, a smart refrigerator, a smart camera, a smart wearable device, a smart security system, a smart thermostat, a smart sensor, a smart fitness/health tracker, a smart hub, a smart switch (e.g., a smart light switch, etc.), a smart appliance, a smart plug, a television, etc.

Figure 8:
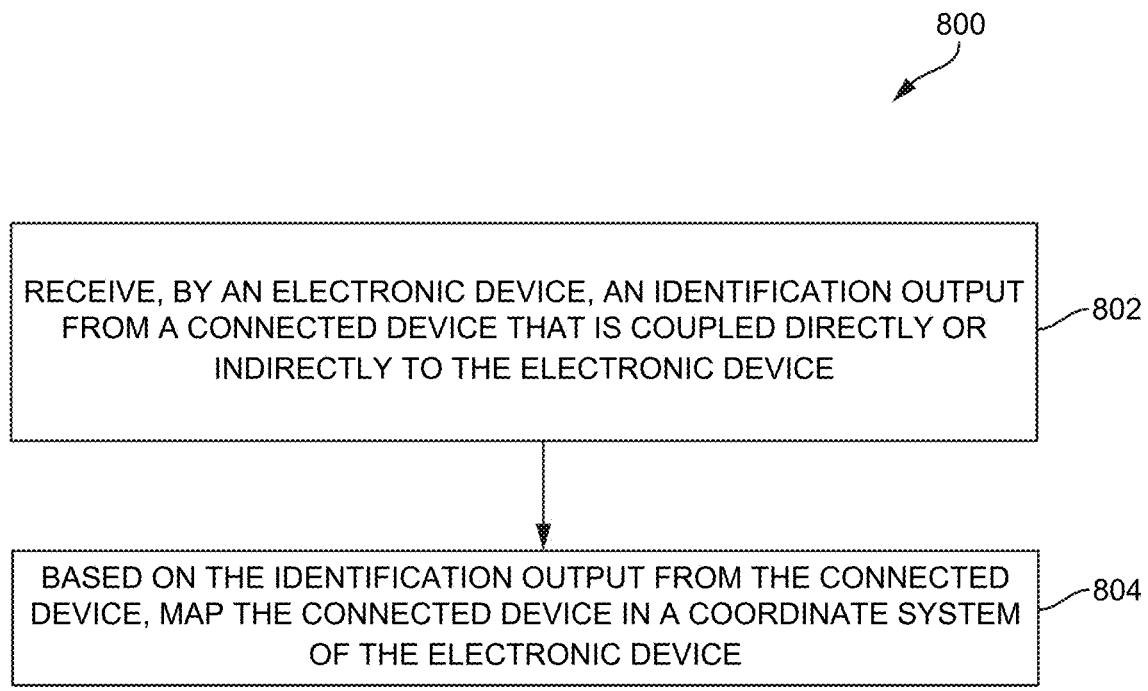
FIG. 8 is a flowchart illustrating an example process for localizing and mapping a connected device, in accordance with some examples of the present disclosure.

FIG. 8 is a flowchart illustrating an example process 800 for localizing and mapping a connected or networked device (e.g., a smart device such as computing device 150). At block 802, the process 800 can include receiving, by an electronic device (e.g., XR system 100), an identification output from a connected device (e.g., computing device 150) that is coupled directly or indirectly to the electronic device. In some cases, the identification output can be reflected or encoded in a radio signal from the connected device. In some examples, the identification output can include an audio pattern, a display pattern, a light pattern, a radio pattern, and/or a combination thereof. For example, the identification output can include a pattern of light levels (e.g., a pattern of dimming and brightening light levels), a pattern of color temperature changes, a pattern of sound (e.g., noise, music, Morse code, a sequence of tones, etc.), a pattern or code encoded in a wireless signal (e.g., a Bluetooth signal, WiFi signal, etc.), a display pattern (e.g., an image, a quick response (QR) code, a barcode, one or more displayed characters/symbols, a digital content item, a digital object, a video, virtual content, a digital rendering, a graphic, a communication code etc.), a combination thereof, etc.

In some cases, the light pattern can include a pattern of light dimming and brightening levels emitted by the electronic device, a pattern of color temperature changes of light emitted by the electronic device, and/or a sequence of blinking light emitted by the electronic device. In some cases, the light pattern can include light visible or invisible to the human eye. For example, the light pattern can include IR light or a pattern of IR light. In some cases, the display pattern can include a code (e.g., a QR code, a barcode, a key, etc.) displayed on a display device of the electronic device, an image displayed on the display device of the electronic device, a visual pattern displayed on the display device of the electronic device, and/or a digital object displayed on the display device of the electronic device. In some cases, the audio pattern can include an audio code output by the electronic device and/or a sequence of sounds output by the electronic device. In some cases, a communication code can be generated from the communication interface of the electronic device.

In some examples, the electronic device can trigger the identification output from the connected device. In some cases, the electronic device can trigger the identification output based on an identification trigger (e.g., identification trigger 204) sent to the connected device. For example, the electronic device can send an identification trigger to the connected device to trigger the identification output from the connected device. To illustrate, the electronic device can send to the connected device a signal configured to trigger the identification output from the connected device; and receive the identification output from the connected device. In some cases, the electronic device can receive one or more identification outputs from a plurality of identification outputs broadcasted by the connected device. The one or more identification outputs can include the identification output.

In some aspects, receiving the identification output, can include detecting the identification output from the connected device. In some examples, the electronic device can detect the identification output using one or more sensors on the electronic device, such as an image sensor(s), a light sensor, and/or an audio sensor(s). For example, the electronic device can detect the identification output based on audio data of the identification output captured by an audio sensor at the electronic device. As another example, the electronic device can detect the identification output based on image data of the identification output captured by an image sensor at the electronic device.

At block 804, the process 800 can include mapping, based on the identification output from the connected device, the connected device in a coordinate system of the electronic device. In some examples, the electronic device can update a device map (e.g., device map 222) to identify a location of the connected device.

In some examples, the process 800 can include determining, based on the identification output, a location of the connected device relative to the electronic device; and mapping the connected device in the coordinate system of the electronic device based on the location of the connected device.

In some examples, the process 800 can include sending, by the electronic device to the connected device, a signal (e.g., a message, a packet, a command, an output, etc.) configured to trigger an additional identification output from the connected device; based on a failure to receive the additional identification output, sending, by the electronic device to the connected device, one or more additional signals at one or more different times, the one or more additional signals being configured to trigger the additional identification output from the connected device; receiving the additional identification output from the connected device; determining a location of the connected device based on the additional identification output; and updating a device map (e.g., device map 222) to associate the connected device with the location of the connected device. In some examples, the mapping of the connected device in the coordinate system of the electronic device can include the updating of the device map to associate the connected device with the location of the connected device.

In some cases, sending the one or more additional signals at one or more different times can include determining the failure to receive the additional identification output while the electronic device is within a threshold proximity to a previously-determined location (e.g., a mapped location) of the connected device and/or a previously-determined location (e.g., a mapped location) of the connected device is within a field-of-view of an image sensor of the electronic device; and sending the one or more additional signals to the connected device based on the failure to receive the additional identification output.

In some examples, sending the one or more additional signals at one or more different times can include sending the one or more additional signals periodically until a predetermined amount of time lapses without receiving the additional identification output from the connected device and/or a number of additional signals are sent without receiving the additional identification output from the connected device.

In some examples, receiving the identification output from the connected device can include detecting the one or more patterns (e.g., an audio pattern, a display pattern, a pattern in a radio signal, and/or a light pattern) in the identification output and recognizing the one or more patterns as the identification output from the connected device. In some cases, the electronic device can detect the one or more patterns based on data from one or more sensors of the electronic device; and recognize the one or more patterns (e.g., an audio pattern, a display pattern, a pattern in a radio signal, and/or a light pattern) as the identification output. In some examples, the one or more sensors can include an image sensor(s), an audio sensor(s), and/or a light sensor(s). In some cases, the electronic device can recognize the one or more patterns (e.g., the audio pattern, the display pattern, the pattern in the radio signal, and/or the light pattern) using a neural network, visual feature matching, and/or audio feature matching.

In some examples, the process 800 can include receiving a request to trigger an action (e.g., adjust a state, perform an operation, implement a setting, etc.) of the connected device; identifying a location of the connected device based on the mapping of the connected device; and sending, by the electronic device to the connected device, a command configured to trigger the action by the connected device. In some examples, the request to trigger the action by the connected device can include a request to send to the electronic device a video feed captured by the connected device, and the process 800 can include sending the command to the connected device; receiving the video feed from the connected device; and displaying the video feed at the electronic device. The command can be configured to trigger the connected device to send the video feed to the electronic device.

In some examples, the request to trigger the action by the connected device can include a request to trigger the connected device to display content from the electronic device (e.g., virtual content or any other content rendered by the electronic device and/or generated by the electronic device), and the process 800 can include sending, to the connected device, data including the command and the content from the electronic device. In some cases, the command is configured to trigger the connected device to display the content from the electronic device.

In some cases, the request to trigger the action by the connected device can include a request to adjust a power mode of the connected device (e.g., turn on the connected device, turn off the connected device, set the connected device to a sleep state, reduce or increase a power or operating mode of the connected device, etc.), and the command can be configured to adjust the power mode of the connected device.

In some examples, the connected device can include a light bulb, and the request to trigger the action by the connected device can include a request to adjust a brightness and/or a color of light emitted by the light bulb. In some cases, the command is configured to trigger the light bulb to adjust the brightness and/or the color of light emitted by the light bulb.

In some examples, the process 800 can include detecting a gesture by a user associated with the electronic device; based on the gesture, triggering one or more identification outputs from one or more connected devices in a physical environment; receiving a particular identification output from the one or more identification outputs; and determining the connected device is located at the location based on the particular identification output. In some examples, the gesture can indicate a location of the connected device. In some examples, the particular identification output originates from the location. In some examples, the process 800 can include updating a device map to associate the connected device with the location of the connected device. In some examples, the gesture can include a hand gesture, an eye gaze, a head pose, pointing a finger, positioning the connected device within a FOV of the electronic device, touching the connected device, and/or any other gesture.

In some examples, the process 800 can include triggering one or more connected devices to enter a mapping mode; sending, to the one or more connected devices, a device identification output; receiving localization information from the one or more connected devices; and based on the localization information from the one or more connected devices, mapping the one or more connected devices in the coordinate system of the electronic device. In some cases, the localization information can indicate a location of the one or more connected devices relative to the electronic device.

In some examples, the process 800 can include triggering one or more connected devices to enter a mapping mode; receiving localization information from the one or more connected devices; determining a second location of the one or more connected devices based on the localization information and a third location of the landmark relative to the electronic device; and mapping the one or more connected devices in the coordinate system of the electronic device based on the second location of the one or more connected devices. In some cases, the localization information can indicate a first location of a landmark relative to the connected device.

In some examples, the process 800 may be performed by one or more computing devices or apparatuses. In one illustrative example, the process 800 can be performed by the XR system 100 shown in FIG. 1. In some examples, the process 800 can be performed by one or more computing devices with the computing device architecture 900 shown in FIG. 9. In some cases, such a computing device or apparatus may include a processor, microprocessor, microcomputer, or other component of a device that is configured to carry out the steps of the process 800. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 800 is illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
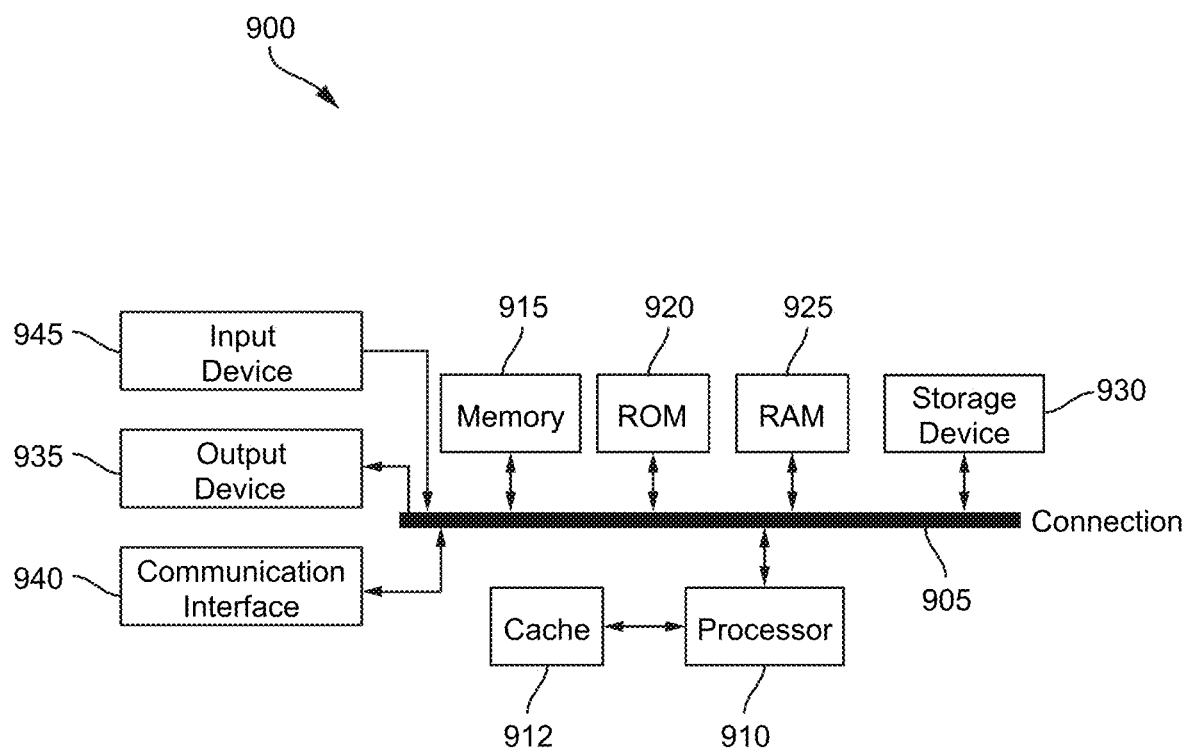
FIG. 9 illustrates an example computing device architecture, in accordance with some examples of the present disclosure.

FIG. 9 illustrates an example computing device architecture 900 of an example computing device which can implement various techniques described herein. For example, the computing device architecture 900 can implement at least some portions of the XR system 100 shown in FIG. 1 or the computing device 150 shown in FIG. 1. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general-purpose processor and a hardware or software service stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include software, code, firmware, etc., for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for localizing one or more devices, the apparatus comprising: memory; and one or more processors coupled to the memory, the one or more processors being configured to: receive an identification output from a connected device that is coupled to the apparatus, the identification output comprising at least one of an audio pattern, a display pattern, and a light pattern; and based on the identification output from the connected device, map the connected device in a coordinate system of the apparatus.

Aspect 2. The apparatus of Aspect 1, wherein the identification output comprises at least one of an audio pattern, a display pattern, a light pattern, and a radio signal.

Aspect 3. The apparatus of any of Aspects 1 to 2, wherein the one or more processors are configured to: determine a location of the connected device based on the identification output; and based on the location of the connected device, map the connected device in the coordinate system of the apparatus.

Aspect 4. The apparatus of any of Aspects 1 to 3, wherein the one or more processors are configured to: send, to the connected device, a signal configured to trigger an additional identification output from the connected device; to the connected device, one or more additional signals at one or more different times, the one or more additional signals being configured to trigger the additional identification output from the connected device; receive the additional identification output from the connected device; and determine a location of the connected device based on the additional identification output; wherein to map the connected device in the coordinate system of the apparatus, the one or more processors are configured to update a device map to associate the connected device with the location of the connected device.

Aspect 5. The apparatus of any of Aspects 1 to 4, wherein, to send the one or more additional signals at one or more different times, the one or more processors are configured to: determine the failure to receive the additional identification output while at least one of the apparatus is within a threshold proximity to a mapped location of the connected device and the mapped location of the connected device is within a field-of-view of an image sensor of the apparatus; and send the one or more additional signals to the connected device based on the failure to receive the additional identification output.

Aspect 6. The apparatus of any of Aspects 1 to 5, wherein, to send the one or more additional signals at one or more different times, the one or more processors are configured to send the one or more additional signals periodically until at least one of a predetermined amount of time lapses without receiving the additional identification output from the connected device and a number of additional signals is sent without receiving the additional identification output from the connected device.

Aspect 7. The apparatus of any of Aspects 1 to 6, wherein, to receive the identification output from the connected device, the one or more processors are configured to: detect one or more patterns in the identification output based on data from one or more sensors of the apparatus; and recognize the one or more patterns as the identification output from the connected device.

Aspect 8. The apparatus of any of Aspects 1 to 7, wherein the one or more patterns comprises an audio pattern and the one or more sensors comprise an audio sensor.

Aspect 9. The apparatus of any of Aspects 1 to 8, wherein the one or more patterns comprises a display pattern and the one or more sensors comprise an image sensor.

Aspect 10. The apparatus of any of Aspects 1 to 9, wherein the one or more patterns comprises a light pattern and the one or more sensors comprise a light sensor.

Aspect 11. The apparatus of any of Aspects 1 to 10, wherein, to recognize the one or more patterns as the identification output from the connected device, the one or more processors are configured to: recognize the one or more patterns as the identification output using at least one of a neural network and feature matching.

Aspect 12. The apparatus of any of Aspects 1 to 11, wherein the one or more processors are configured to: receive a request to trigger an action by the connected device; identify a location of the connected device based on the mapping of the connected device; and send, to the connected device, a command configured to trigger the action by the connected device.

Aspect 13. The apparatus of any of Aspects 1 to 12, wherein the request to trigger the action by the connected device comprises a request to send to the apparatus a video feed captured by the connected device, and wherein the one or more processors are configured to:

send the command to the connected device, wherein the command is configured to trigger the connected device to send the video feed to the apparatus; receive the video feed from the connected device; and display the video feed at the apparatus.

Aspect 14. The apparatus of any of Aspects 1 to 13, wherein the request to trigger the action by the connected device comprises a request to trigger the connected device to display content from the apparatus, and wherein to send the command to the connected device, the one or more processors are configured to: send, to the connected device, data comprising the command and the content from the apparatus, wherein the command is configured to trigger the connected device to display the content from the apparatus.

Aspect 15. The apparatus of any of Aspects 1 to 14, wherein the request to trigger the action by the connected device comprises a request to adjust a power mode of the connected device, and wherein the command is configured to adjust the power mode of the connected device.

Aspect 16. The apparatus of any of Aspects 1 to 15, wherein the connected device comprises a light bulb, wherein the request to trigger the action by the connected device comprises a request to adjust at least one of a brightness and a color of light emitted by the light bulb, and wherein the command is configured to trigger the light bulb to adjust at least one of the brightness and the color of light emitted by the light bulb.

Aspect 17. The apparatus of any of Aspects 1 to 16, wherein the one or more processors are configured to: detect a gesture by a user associated with the apparatus, the gesture indicating a location of the connected device; based on the gesture, trigger one or more identification outputs from one or more connected devices in a physical environment; receive a particular identification output from the one or more identification outputs, the particular identification output originating from the location; and determine, based on the particular identification output, that the connected device is located at the location.

Aspect 18. The apparatus of any of Aspects 1 to 17, wherein to map the connected device in the coordinate system of the apparatus, the one or more processors are configured to: update a device map to associate the connected device with the location of the connected device.

Aspect 19. The apparatus of any of Aspects 1 to 18, wherein the gesture comprises at least one of pointing to the one or more connected devices, touching the one or more connected devices, positioning the one or more connected devices within a field-of-view of an image sensor of the apparatus, a hand gesture, and an eye gaze.

Aspect 20. The apparatus of any of Aspects 1 to 19, wherein the one or more processors are configured to: receive a voice command by a user associated with the apparatus, the voice command indicating a location of the connected device; based on the voice command, trigger one or more identification outputs from one or more connected devices in a physical environment; receive a particular identification output from the one or more identification outputs, the particular identification output originating from the location; and determine, based on the particular identification output, that the connected device is located at the location.

Aspect 21. The apparatus of any of Aspects 1 to 20, wherein the one or more processors are configured to: trigger one or more connected devices to enter a mapping mode; send, to the one or more connected devices, a device identification output; receive localization information from the one or more connected devices, the localization information indicating a location of the one or more connected devices relative to the apparatus; and based on the localization information from the one or more connected devices, map the one or more connected devices in the coordinate system of the apparatus.

Aspect 22. The apparatus of any of Aspects 1 to 21, wherein the one or more processors are configured to: trigger one or more connected devices to enter a mapping mode; receive localization information from the one or more connected devices, the localization information indicating a first location of a landmark relative to the one or more connected devices; determine a second location of the one or more connected devices based on the localization information and a third location of the landmark relative to the apparatus; and map the one or more connected devices in the coordinate system of the apparatus based on the second location of the one or more connected devices.

Aspect 23. The apparatus of any of Aspects 1 to 22, wherein the identification output comprises a light pattern, and wherein the light pattern comprises at least one of a pattern of light dimming and brightening levels emitted by the apparatus, a pattern of color temperature changes of light emitted by the apparatus, and a sequence of blinking light emitted by the apparatus.

Aspect 24. The apparatus of any of Aspects 1 to 23, wherein the identification output comprises a display pattern, and wherein the display pattern comprises at least one of a code displayed on a display device of the apparatus, an image displayed on the display device of the apparatus, a visual pattern displayed on the display device of the apparatus, and a digital object displayed on the display device of the apparatus.

Aspect 25. The apparatus of any of Aspects 1 to 24, wherein the identification output comprises an audio pattern, and wherein the audio pattern comprises at least one of an audio code output by the apparatus and a sequence of sounds output by the apparatus.

Aspect 26. The apparatus of any of Aspects 1 to 25, wherein the one or more processors are configured to: send, to the connected device, a signal configured to trigger the identification output from the connected device; and receive the identification output from the connected device.

Aspect 27. The apparatus of any of Aspects 1 to 26, wherein, to receive the identification output, the one or more processors are configured to: receive one or more identification outputs from a plurality of identification outputs broadcasted by the connected device, the one or more identification outputs comprising the identification output.

Aspect 28. The apparatus of any of Aspects 1 to 27, wherein the apparatus is an extended reality device.

Aspect 29. The apparatus of any of Aspects 1 to 28, wherein the apparatus comprises an extended reality device.

Aspect 30. The apparatus of any of Aspects 1 to 29, wherein the apparatus is a mobile device.

Aspect 31. The apparatus of any of Aspects 1 to 30, wherein the apparatus comprises a mobile device.

Aspect 32. The apparatus of any of Aspects 1 to 31, wherein the apparatus is at least one of a display configured to display data and a camera configured to capture image data.

Aspect 33. The apparatus of any of Aspects 1 to 32, wherein the apparatus comprises at least one of a display configured to display data and a camera configured to capture image data.

Aspect 34. The apparatus of any of Aspects 1 to 33, wherein the connected device is at least one of a light bulb, a speaker, a television, a microphone, one or more sensors, a camera, a thermostat, and a wearable device.

Aspect 35. The apparatus of any of Aspects 1 to 34, wherein the connected device comprises at least one of a light bulb, a speaker, a television, a microphone, one or more sensors, a camera, a thermostat, and a wearable device.

Aspect 36. The apparatus of any of Aspects 1 to 35, wherein the identification output comprises a received radio signal.

Aspect 37. A method for localizing one or more devices, the method comprising: receiving an identification output from a connected device that is coupled to an electronic device; and based on the identification output from the connected device, mapping the connected device in a coordinate system of the electronic device.

Aspect 38. The method of Aspect 37, wherein the identification output comprises at least one of an audio pattern, a display pattern, a light pattern, and a radio signal.

Aspect 39. The method of any of Aspects 37 to 38, further comprising: determining a location of the connected device based on the identification output; and based on the location of the connected device, mapping the connected device in the coordinate system of the electronic device.

Aspect 40. The method of any of Aspects 37 to 39, further comprising: sending, to the connected device, a signal configured to trigger an additional identification output from the connected device; to the connected device, one or more additional signals at one or more different times, the one or more additional signals being configured to trigger the additional identification output from the connected device; receiving the additional identification output from the connected device; and determining a location of the connected device based on the additional identification output; wherein mapping the connected device in the coordinate system of the electronic device comprises updating a device map to associate the connected device with the location of the connected device.

Aspect 41. The method of any of Aspects 37 to 40, wherein sending the one or more additional signals at one or more different times comprises: determining the failure to receive the additional identification output while at least one of the electronic device is within a threshold proximity to a mapped location of the connected device and the mapped location of the connected device is within a field-of-view of an image sensor of the electronic device; and sending the one or more additional signals to the connected device based on the failure to receive the additional identification output.

Aspect 42. The method of any of Aspects 37 to 41, wherein sending the one or more additional signals at one or more different times comprises sending the one or more additional signals periodically until at least one of a predetermined amount of time lapses without receiving the additional identification output from the connected device and a number of additional signals is sent without receiving the additional identification output from the connected device.

Aspect 43. The method of any of Aspects 37 to 42, wherein receiving the identification output from the connected device comprises: detecting one or more patterns in the identification output based on data from one or more sensors of the electronic device; and recognizing the one or more patterns as the identification output from the connected device.

Aspect 44. The method of any of Aspects 37 to 43, wherein the one or more patterns comprises an audio pattern and the one or more sensors comprise an audio sensor.

Aspect 45. The method of any of Aspects 37 to 44, wherein the one or more patterns comprises a display pattern and the one or more sensors comprise an image sensor.

Aspect 46. The method of any of Aspects 37 to 45, wherein the one or more patterns comprises a light pattern and the one or more sensors comprise a light sensor.

Aspect 47. The method of any of Aspects 37 to 46, wherein recognizing the one or more patterns as the identification output from the connected device comprises: recognizing the one or more patterns as the identification output using at least one of a neural network and feature matching.

Aspect 48. The method of any of Aspects 37 to 47, further comprising: receiving a request to trigger an action by the connected device; identifying a location of the connected device based on the mapping of the connected device; and sending, to the connected device, a command configured to trigger the action by the connected device.

Aspect 49. The method of any of Aspects 37 to 48, wherein the request to trigger the action by the connected device comprises a request to send to the electronic device a video feed captured by the connected device, the method further comprising: sending the command to the connected device, wherein the command is configured to trigger the connected device to send the video feed to the electronic device; receiving the video feed from the connected device; and displaying the video feed at the electronic device.

Aspect 50. The method of any of Aspects 37 to 49, wherein the request to trigger the action by the connected device comprises a request to trigger the connected device to display content from the electronic device, and wherein sending the command to the connected device comprises: sending, to the connected device, data comprising the command and the content from the electronic device, wherein the command is configured to trigger the connected device to display the content from the electronic device.

Aspect 51. The method of any of Aspects 37 to 50, wherein the request to trigger the action by the connected device comprises a request to adjust a power mode of the connected device, and wherein the command is configured to adjust the power mode of the connected device.

Aspect 52. The method of any of Aspects 37 to 51, wherein the connected device comprises a light bulb, wherein the request to trigger the action by the connected device comprises a request to adjust at least one of a brightness and a color of light emitted by the light bulb, and wherein the command is configured to trigger the light bulb to adjust at least one of the brightness and the color of light emitted by the light bulb.

Aspect 53. The method of any of Aspects 37 to 52, further comprising: detecting a gesture by a user associated with the electronic device, the gesture indicating a location of the connected device; based on the gesture, triggering one or more identification outputs from one or more connected devices in a physical environment; receiving a particular identification output from the one or more identification outputs, the particular identification output originating from the location; and determining, based on the particular identification output, that the connected device is located at the location.

Aspect 54. The method of any of Aspects 37 to 53, wherein mapping the connected device in the coordinate system of the electronic device comprises: updating a device map to associate the connected device with the location of the connected device.

Aspect 55. The method of any of Aspects 37 to 54, wherein the gesture comprises at least one of pointing to the one or more connected devices, touching the one or more connected devices, positioning the one or more connected devices within a field-of-view of an image sensor of the electronic device, a hand gesture, and an eye gaze.

Aspect 56. The method of any of Aspects 37 to 55, further comprising: receiving a voice command by a user associated with the electronic device, the voice command indicating a location of the connected device; based on the voice command, triggering one or more identification outputs from one or more connected devices in a physical environment; receiving a particular identification output from the one or more identification outputs, the particular identification output originating from the location; and determining, based on the particular identification output, that the connected device is located at the location.

Aspect 57. The method of any of Aspects 37 to 56, further comprising: triggering one or more connected devices to enter a mapping mode; sending, to the one or more connected devices, a device identification output; receive localization information from the one or more connected devices, the localization information indicating a location of the one or more connected devices relative to the electronic device; and based on the localization information from the one or more connected devices, mapping the one or more connected devices in the coordinate system of the electronic device.

Aspect 58. The method of any of Aspects 37 to 57, further comprising: triggering one or more connected devices to enter a mapping mode; receiving localization information from the one or more connected devices, the localization information indicating a first location of a landmark relative to the one or more connected devices; determining a second location of the one or more connected devices based on the localization information and a third location of the landmark relative to the electronic device; and mapping the one or more connected devices in the coordinate system of the electronic device based on the second location of the one or more connected devices.

Aspect 59. The method of any of Aspects 37 to 58, wherein the identification output comprises a light pattern, and wherein the light pattern comprises at least one of a pattern of light dimming and brightening levels emitted by the electronic device, a pattern of color temperature changes of light emitted by the electronic device, and a sequence of blinking light emitted by the electronic device.

Aspect 60. The method of any of Aspects 37 to 59, wherein the identification output comprises a display pattern, and wherein the display pattern comprises at least one of a code displayed on a display device of the electronic device, an image displayed on the display device of the electronic device, a visual pattern displayed on the display device of the electronic device, and a digital object displayed on the display device of the electronic device.

Aspect 61. The method of any of Aspects 37 to 60, wherein the identification output comprises an audio pattern, and wherein the audio pattern comprises at least one of an audio code output by the electronic device and a sequence of sounds output by the electronic device.

Aspect 62. The method of any of Aspects 37 to 61, further comprising: sending, to the connected device, a signal configured to trigger the identification output from the connected device; and receiving the identification output from the connected device.

Aspect 63. The method of any of Aspects 37 to 62, wherein receiving the identification output comprises: receiving one or more identification outputs from a plurality of identification outputs broadcasted by the connected device, the one or more identification outputs comprising the identification output.

Aspect 64. The method of any of Aspects 37 to 63, wherein the connected device is at least one of a light bulb, a speaker, a television, a microphone, one or more sensors, a camera, a thermostat, and a wearable device.

Aspect 65. The method of any of Aspects 37 to 64, wherein the connected device comprises at least one of a light bulb, a speaker, a television, a microphone, one or more sensors, a camera, a thermostat, and a wearable device.

Aspect 66. The method of any of Aspects 37 to 65, wherein the identification output comprises a received radio signal.

Aspect 67. The method of any of Aspects 37 to 66, wherein the electronic device is or comprises an XR device.

Aspect 68. The method of any of Aspects 37 to 67, wherein the electronic device is or comprises a mobile device.

Aspect 69. The method of any of Aspects 37 to 68, wherein the electronic device comprises a camera.

Aspect 70. The method of any of Aspects 37 to 69, wherein the electronic device comprises a display device.

Aspect 71. A non-transitory computer-readable medium having stored thereon instructions which, when executed by one or more processors, cause the one or more processors to perform a method according to any of Aspects 37 to 70.

Aspect 72. An apparatus comprising means for performing a method according to any of Aspects 37 to 70.

Aspect 73. The apparatus of Aspect 72, wherein the apparatus is or comprises the electronic device.

Aspect 74. The apparatus of any of Aspects 72 to 73, wherein the apparatus comprises a mobile device.

Aspect 75. The apparatus of any of Aspects 72 to 74, wherein the apparatus comprises a camera.

Aspect 76. The apparatus of any of Aspects 72 to 75, wherein the apparatus comprises a display device.

Aspect 77. An apparatus for localizing one or more devices, the apparatus comprising: memory; and one or more processors coupled to the memory, the one or more processors being configured to: determine localization data for a connected device based on at least one of a first identification output of the connected device, a second identification output of the apparatus, action tracking data and a first joint localization information; and based on the determined localization data, map the connected device in a coordinate system of the apparatus.

Aspect 78. The apparatus of Aspect 77, wherein the identification output comprises at least one of an audio pattern, a display pattern, and a light pattern.

Aspect 79. The apparatus of any of Aspects 77 to 78, wherein the one or more processors are configured to determine the localization data for the connected device by: detecting the first identification output from the connected device; and determining the localization data based on the first localization information.

Aspect 80. The apparatus of any of Aspects 77 to 79, wherein the one or more processors are configured to determine the localization data for the connected device by: sending the second identification output to the connected device; receiving the localization information from the connected device, the localization information indicating a location of the connected devices relative to the apparatus; and determining the localization data based on the localization information.

Aspect 81. The apparatus of any of Aspects 77 to 80, wherein the one or more processors are configured to: determine tracking data for the apparatus; and determine the localization data based on the tracking data and the action tracking data.

Aspect 82. The apparatus of any of Aspects 77 to 81, wherein the one or more processors are configured to determine the localization data for the connected device by: receiving the first joint localization information from the connected device, the first joint localization information indicating a first location of a landmark relative to the connected devices; determining a second joint localization information, the second joint localization information indicating a second location of the landmark relative to the apparatus; and determining the localization data based on the first and second joint localization information.

Aspect 83. The apparatus of any of Aspects 77 to 82, wherein the first joint localization information includes a feature vector describing features of the landmark, and the one or more processors are configured to use the feature vector to verify that the first joint localization information corresponds to the landmark.

Aspect 84. The apparatus of any of Aspects 77 to 83, wherein the apparatus is or comprises an XR device.

Aspect 85. The apparatus of any of Aspects 77 to 84, wherein the apparatus is or comprises a mobile device.

Aspect 86. A method for localizing one or more devices, the method comprising: determining localization data for a connected device based on at least one of a first identification output of the connected device, a second identification output of an electronic device, action tracking data and a first joint localization information; and based on the determined localization data, mapping the connected device in a coordinate system of the electronic device.

Aspect 87. The method of Aspect 86, wherein the identification output comprises at least one of an audio pattern, a display pattern, and a light pattern.

Aspect 88. The method of any of Aspects 86 to 87, further comprising determining the localization data for the connected device by: detecting the first identification output from the connected device; and determining the localization data based on the first localization information.

Aspect 89. The method of any of Aspects 86 to 88, further comprising determining the localization data for the connected device by: sending the second identification output to the connected device; receiving the localization information from the connected device, the localization information indicating a location of the connected devices relative to the electronic device; and determining the localization data based on the localization information.

Aspect 90. The method of any of Aspects 86 to 89, further comprising determining tracking data for the electronic device; and determining the localization data based on the tracking data and the action tracking data.

Aspect 91. The method of any of Aspects 86 to 90, further comprising determining the localization data for the connected device by: receiving the first joint localization information from the connected device, the first joint localization information indicating a first location of a landmark relative to the connected devices; determining a second joint localization information, the second joint localization information indicating a second location of the landmark relative to the electronic device; and determining the localization data based on the first and second joint localization information.

Aspect 92. The method of any of Aspects 86 to 91, wherein the first joint localization information includes a feature vector describing features of the landmark, the method further comprising using the feature vector to verify that the first joint localization information corresponds to the landmark.

Aspect 93. The method of any of Aspects 86 to 92, wherein the electronic device is or comprises an XR device.

Aspect 94. The method of any of Aspects 86 to 93, wherein the electronic device is or comprises a mobile device.

Aspect 95. An apparatus comprising means for performing a method according to any of Aspects 86 to 94.

Aspect 96. The apparatus of Aspect 95, wherein the apparatus is or comprises the electronic device.

Aspect 97. A non-transitory computer-readable medium having stored thereon instructions which, when executed by one or more processors, cause the one or more processors to perform a method according to any of Aspects 86 to 94.

Aspect 98. The apparatus of any of Aspects 1 to 36, wherein the connected device is coupled directly or indirectly to the apparatus.

Aspect 99. The method of any of Aspects 37 to 70, wherein the connected device is coupled directly or indirectly to the electronic device.

What is claimed is:

1. An extended reality (XR) headset for localizing one or more devices, the XR headset comprising:
    at least one memory; and
    at least one processor coupled to the at least one memory, the at least one processor being configured to:
        send, to a connected device coupled to the XR headset, a signal configured to trigger an identification output from the connected device, wherein the connected device is located in a physical environment;
        receive the identification output from the connected device in response to the signal, the identification output comprising at least one of an audio pattern, a display pattern, or a light pattern;
        based on the identification output from the connected device, determine a location of the connected device in the physical environment;
        map the location of the connected device in the physical environment to a location in a coordinate system of the XR headset;
        update a device map to include the connected device at the location in the coordinate system of the XR headset, the device map including a mapping of connected devices localized relative to the XR headset in the coordinate system of the XR headset;
        detect a user input directed at the location in the physical environment; and
        generate one or more commands to control the connected device in response to the user input and a determination, from the device map based on the detected user input, that the connected device is mapped to the location in the coordinate system of the XR headset.

2. The XR headset of claim 1, wherein the at least one processor is configured to:
    send, to an additional connected device coupled to the XR headset, a signal configured to trigger an identification output from the additional connected device;
    based on a failure to receive the identification output from the additional connected device send, to the additional connected device, one or more additional signals at one or more different times, the one or more additional signals being configured to trigger the identification output from the additional connected device;
    receive the identification output from the additional connected device in response to at least one of the one or more additional signals;
    determine a location of the additional connected device in the physical environment based on the identification output from the additional connected device;
    map the location of the additional connected device to an additional location in the coordinate system of the XR headset; and
    update the device map to include the additional connected device at the additional location in the coordinate system of the XR headset.

3. The XR headset of claim 2, wherein the at least one processor is configured to:
    determine the failure to receive the identification output from the additional connected device while at least one of the XR headset is within a threshold proximity to the location of the additional connected device or the location of the additional connected device is within a field-of-view of an image sensor of the XR headset.

4. The XR headset of claim 2, wherein the at least one processor is configured to send the one or more additional signals periodically until at least one of a predetermined amount of time lapses without receiving the identification output from the additional connected device or a number of additional signals is sent without receiving the identification output from the additional connected device.

5. The XR headset of claim 1, wherein, to receive the identification output from the connected device, the at least one processor is configured to:
    detect one or more patterns in the identification output based on data from one or more sensors of the XR headset; and
    recognize the one or more patterns as the identification output from the connected device.

6. The XR headset of claim 5, wherein the one or more patterns comprises the audio pattern and the one or more sensors comprise an audio sensor.

7. The XR headset of claim 5, wherein the one or more patterns comprises the display pattern and the one or more sensors comprise an image sensor.

8. The XR headset of claim 5, wherein the one or more patterns comprises the light pattern and the one or more sensors comprise a light sensor.

9. The XR headset of claim 5, wherein, to recognize the one or more patterns as the identification output from the connected device, the at least one processor is configured to:
    recognize the one or more patterns as the identification output using at least one of a neural network or feature matching.

10. The XR headset of claim 1, wherein the user input includes a request to trigger an action by the connected device, and wherein the at least one processor is configured to:
    send, to the connected device, the one or more commands to trigger the action by the connected device.

11. The XR headset of claim 1, wherein the user input includes a request to send to the XR headset a video feed captured by the connected device, and wherein the at least one processor is configured to:
    send a command of the one or more commands to the connected device, wherein the command is configured to trigger the connected device to send the video feed to the XR headset;
    receive the video feed from the connected device; and
    display the video feed at the XR headset.

12. The XR headset of claim 1, wherein the user input includes a request to trigger the connected device to display content from the XR headset, and wherein the at least one processor is configured to:
    send, to the connected device, data comprising a command of the one or more commands and the content from the XR headset, wherein the command is configured to trigger the connected device to display the content from the XR headset.

13. The XR headset of claim 1, wherein the user input includes a request to adjust a power mode of the connected device, and wherein a command of the one or more commands is configured to adjust the power mode of the connected device.

14. The XR headset of claim 1, wherein the connected device comprises a light bulb, wherein the user input includes a request to adjust at least one of a brightness or a color of light emitted by the light bulb, and wherein a command of the one or more commands is configured to trigger the light bulb to adjust at least one of the brightness or the color of light emitted by the light bulb.

15. The XR headset of claim 1, wherein the at least one processor is configured to:
    detect a gesture by a user associated with the XR headset, the gesture indicating the location of the connected device in the physical environment;
    based on the gesture, trigger one or more identification outputs from one or more connected devices in a physical environment;
    receive a particular identification output from the one or more identification outputs, the particular identification output originating from the location; and
    determine, based on the particular identification output, that the connected device is located at the location.

16. The XR headset of claim 15, wherein to map the location of the connected device in the physical environment to the location in the coordinate system of the XR headset, the at least one processor is configured to:
    update the device map to associate the connected device with the location of the connected device indicated by the gesture.

17. The XR headset of claim 1, wherein the at least one processor is configured to:
    trigger one or more connected devices to enter a mapping mode;
    send, to the one or more connected devices, a device identification output;
    receive localization information from the one or more connected devices, the localization information indicating a location of the one or more connected devices relative to the XR headset; and
    based on the localization information from the one or more connected devices, map the one or more connected devices in the coordinate system of the XR headset.

18. The XR headset of claim 1, wherein the at least one processor is configured to:
    trigger one or more connected devices to enter a mapping mode;
    receive localization information from the one or more connected devices, the localization information indicating a first location of a landmark relative to the one or more connected devices;
    determine a second location of the one or more connected devices based on the localization information and a third location of the landmark relative to the XR headset; and
    map the one or more connected devices in the coordinate system of the XR headset based on the second location of the one or more connected devices.

19. The XR headset of claim 1, wherein the light pattern comprises at least one of a pattern of light dimming and brightening levels emitted by the XR headset, a pattern of color temperature changes of light emitted by the XR headset, or a sequence of blinking light emitted by the XR headset.

20. The XR headset of claim 1, wherein the display pattern comprises at least one of a code displayed on a display device of the XR headset, an image displayed on the display device of the XR headset, a visual pattern displayed on the display device of the XR headset, or a digital object displayed on the display device of the XR headset.

21. The XR headset of claim 1, wherein the audio pattern comprises at least one of an audio code output by the XR headset or a sequence of sounds output by the XR headset.

22. The XR headset of claim 1, wherein, to receive the identification output, the at least one processor is configured to:
receive one or more identification outputs from a plurality of identification outputs broadcasted by the connected device, the one or more identification outputs comprising the identification output.

23. The XR headset of claim 1, wherein the XR headset comprises at least one of a display configured to display data and a camera configured to capture image data.

24. The XR headset of claim 1, wherein the connected device is at least one of a light bulb, a speaker, a television, a microphone, one or more sensors, a camera, a thermostat, and a wearable device.

25. The XR headset of claim 1, wherein the connected device is directly coupled to the XR headset through a communication network.

26. The XR headset of claim 25, wherein the communication network is a Bluetooth communication network, and wherein the signal is a Bluetooth communication signal.

27. A method for localizing one or more devices, the method comprising:
sending, to a connected device coupled to an extended reality (XR) headset, a signal configured to trigger an identification output from the connected device, wherein the connected device is located in a physical environment;
receiving the identification output from the connected device in response to the signal, the identification output comprising at least one of an audio pattern, a display pattern, or a light pattern;
based on the identification output from the connected device, determining a location of the connected device in the physical environment;
mapping the location of the connected device in the physical environment to a location in a coordinate system of the XR headset;
updating a device map to include the connected device at the location in the coordinate system of the XR headset, the device map including a mapping of connected devices localized relative to the XR headset in the coordinate system of the XR headset;
detecting a user input directed at the location in the physical environment; and
generating one or more commands to control the connected device in response to the user input and a determination, from the device map based on the detected user input, that the connected device is mapped to the location in the coordinate system of the XR headset-using the device map.

28. The method of claim 27, further comprising:
sending, to an additional connected device coupled to the XR headset, a signal configured to trigger an identification output from the additional connected device;
based on a failure to receive the identification output from the additional connected device, sending, to the additional connected device, one or more additional signals at one or more different times, the one or more additional signals being configured to trigger the identification output from the additional connected device;
receiving the identification output from the additional connected device in response to at least one of the one or more additional signals;
determining a location of the additional connected device in the physical environment based on the identification output from the additional connected device;
mapping the location of the additional connected device to an additional location in the coordinate system of the XR headset; and
updating the device map to include the additional connected device at the additional location in the coordinate system of the XR headset.

29. The method of claim 28, wherein sending the one or more additional signals at one or more different times comprises:
determining the failure to receive the identification output from the additional connected device while at least one of the XR headset is within a threshold proximity to the location of the additional connected device or the location of the additional connected device is within a field-of-view of an image sensor of the XR headset.

30. The method of claim 28, wherein sending the one or more additional signals at one or more different times comprises sending the one or more additional signals periodically until at least one of a predetermined amount of time lapses without receiving the identification output from the additional connected device or a number of additional signals is sent without receiving the identification output from the additional connected device.

31. The method of claim 27, wherein receiving the identification output from the connected device comprises:
detecting at least one of the audio pattern, the display pattern, or the light pattern in the identification output based on data from one or more sensors of the XR headset; and
recognizing at least one of the audio pattern, the display pattern, or the light pattern as the identification output from the connected device.

32. The method of claim 31, wherein recognizing at least one of the audio pattern, the display pattern, or the light pattern as the identification output from the connected device comprises:
recognizing at least one of the audio pattern, the display pattern, or the light pattern as the identification output using at least one of a neural network or feature matching, wherein the one or more sensors comprise at least one of an audio sensor, a light sensor, or an image sensor.

33. The method of claim 27, wherein the user input includes a request to trigger an action by the connected device, the method further comprising:
sending, to the connected device, the one or more commands to trigger the action by the connected device.

34. The method of claim 27, wherein the user input includes a request to send to the XR headset a video feed captured by the connected device, the method further comprising:
sending a command of the one or more commands to the connected device, wherein the command is configured to trigger the connected device to send the video feed to the XR headset;
receiving the video feed from the connected device; and
displaying the video feed at the XR headset.

35. The method of claim 27, wherein the user input includes a request to trigger the connected device to display content from the XR headset, the method further comprising: sending, to the connected device, data comprising a command of the one or more commands and the content from the XR headset, wherein the command is configured to trigger the connected device to display the content from the XR headset.

36. The method of claim 27, wherein the user input includes a request to adjust a power mode of the connected device, and wherein a command of the one or more commands is configured to adjust the power mode of the connected device.

37. The method of claim 27, further comprising:
detecting a gesture by a user associated with the XR headset, the gesture indicating the location of the connected device in the physical environment;
based on the gesture, triggering one or more identification outputs from one or more connected devices in a physical environment;
receiving a particular identification output from the one or more identification outputs, the particular identification output originating from the location; and
determining, based on the particular identification output, that the connected device is located at the location.

38. The method of claim 27, further comprising:
triggering one or more connected devices to enter a mapping mode;
sending, to the one or more connected devices, a device identification output;
receive localization information from the one or more connected devices, the localization information indicating a location of the one or more connected devices relative to the XR headset; and
based on the localization information from the one or more connected devices, mapping the one or more connected devices in the coordinate system of the XR headset.

39. The method of claim 27, further comprising:
triggering one or more connected devices to enter a mapping mode;
receiving localization information from the one or more connected devices, the localization information indicating a first location of a landmark relative to the one or more connected devices;
determining a second location of the one or more connected devices based on the localization information and a third location of the landmark relative to the XR headset; and
mapping the one or more connected devices in the coordinate system of the XR headset based on the second location of the one or more connected devices.

40. The method of claim 27, wherein receiving the identification output comprises:
receiving one or more identification outputs from a plurality of identification outputs broadcasted by the connected device, the one or more identification outputs comprising the identification output.

* * * * *